United States Patent [19]

Ames et al.

[11] Patent Number: 5,090,803
[45] Date of Patent: Feb. 25, 1992

[54] OPTICAL COORDINATE TRANSFER ASSEMBLY

[75] Inventors: Lawrence L. Ames, San Jose; Calvin W. Gillard; Neal E. Buholz, both of Palo Alto, all of Calif.

[73] Assignee: Lockheed Missiles & Space Company, Inc., Sunnyvale, Calif.

[21] Appl. No.: 586,161

[22] Filed: Sep. 21, 1990

[51] Int. Cl.[5] .................... G01B 11/28; G02B 5/122
[52] U.S. Cl. .................... 356/152; 359/529
[58] Field of Search ............ 356/141, 152, 144, 147, 356/400; 250/561; 350/102, 628; 359/529

[56] References Cited

U.S. PATENT DOCUMENTS

| | | | |
|---|---|---|---|
| 3,218,913 | 11/1965 | Kaestner | 356/152 |
| 3,555,285 | 1/1971 | Irving | 356/152 X |
| 4,105,339 | 8/1978 | Wirtanen | 356/152 |
| 4,123,165 | 10/1978 | Brown et al. | 356/152 |
| 4,155,096 | 5/1979 | Thomas et al. | 356/152 X |
| 4,721,386 | 1/1988 | Collyer | 356/152 |
| 4,798,461 | 1/1989 | Pavlin et al. | 356/152 X |
| 4,843,272 | 6/1989 | Savino | 356/400 X |
| 4,847,511 | 7/1989 | Takada et al. | 356/152 |
| 4,889,425 | 12/1989 | Edwards et al. | 356/152 |

*Primary Examiner*—Stephen C. Buczinski
*Attorney, Agent, or Firm*—John J. Morrissey

[57] ABSTRACT

An optical coordinate transfer assembly provides angular correlation between spatially separated objects. In a particular embodiment of the invention, roll, pitch and yaw of a second directional device 12 relative to a first directional device 11 can be measured (and correction and/or compensation therefor can be made) using an optical alignment sensor 20 mounted on the first directional device 11 and a rooftop-mirror/lens assembly 21 mounted on the second directional device 12. Light beams projected from the optical alignment sensor 20 are reflected by reflector devices 35 and 36 on the rooftop-mirror/lens assembly 21 to linear arrays 69, 70 and 78 of photodetectors, which generate electronic signals indicating angular discrepancies between the orientations of the first and second directional devices 11 and 12 in three degrees of freedom to sub-microradian accuracy over a wide range of measurements.

106 Claims, 8 Drawing Sheets

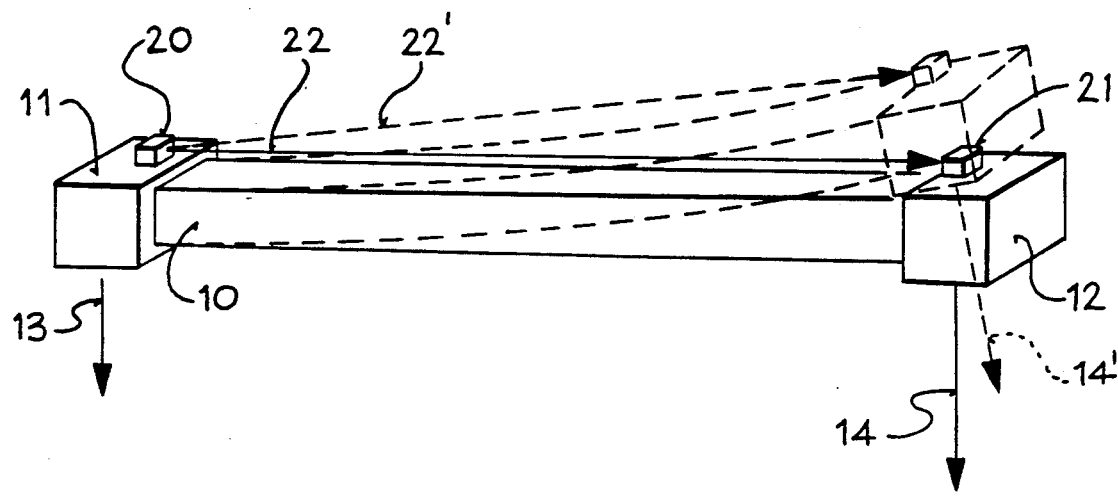
FIG_1
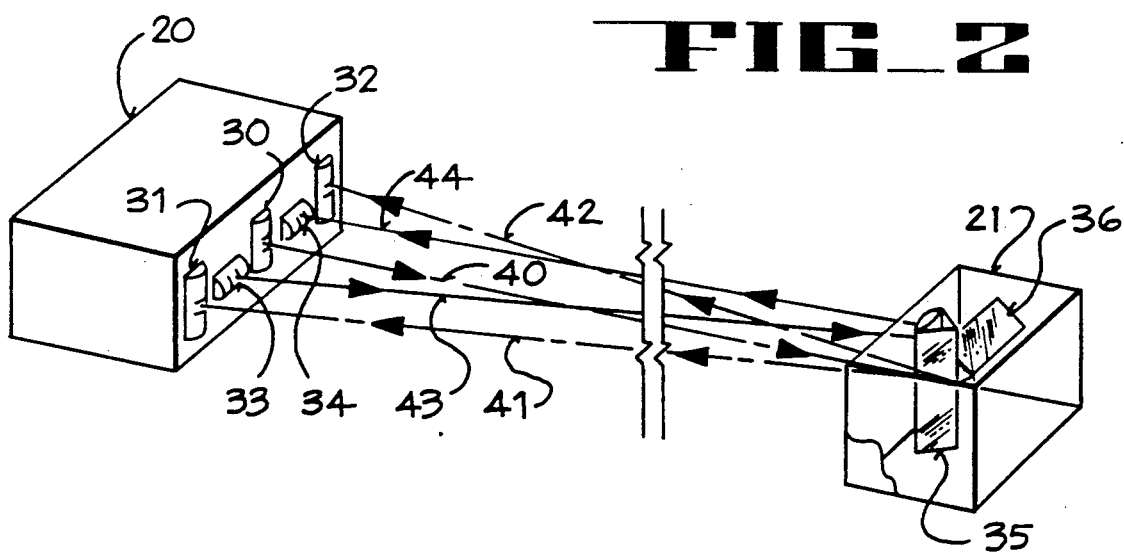
FIG_2

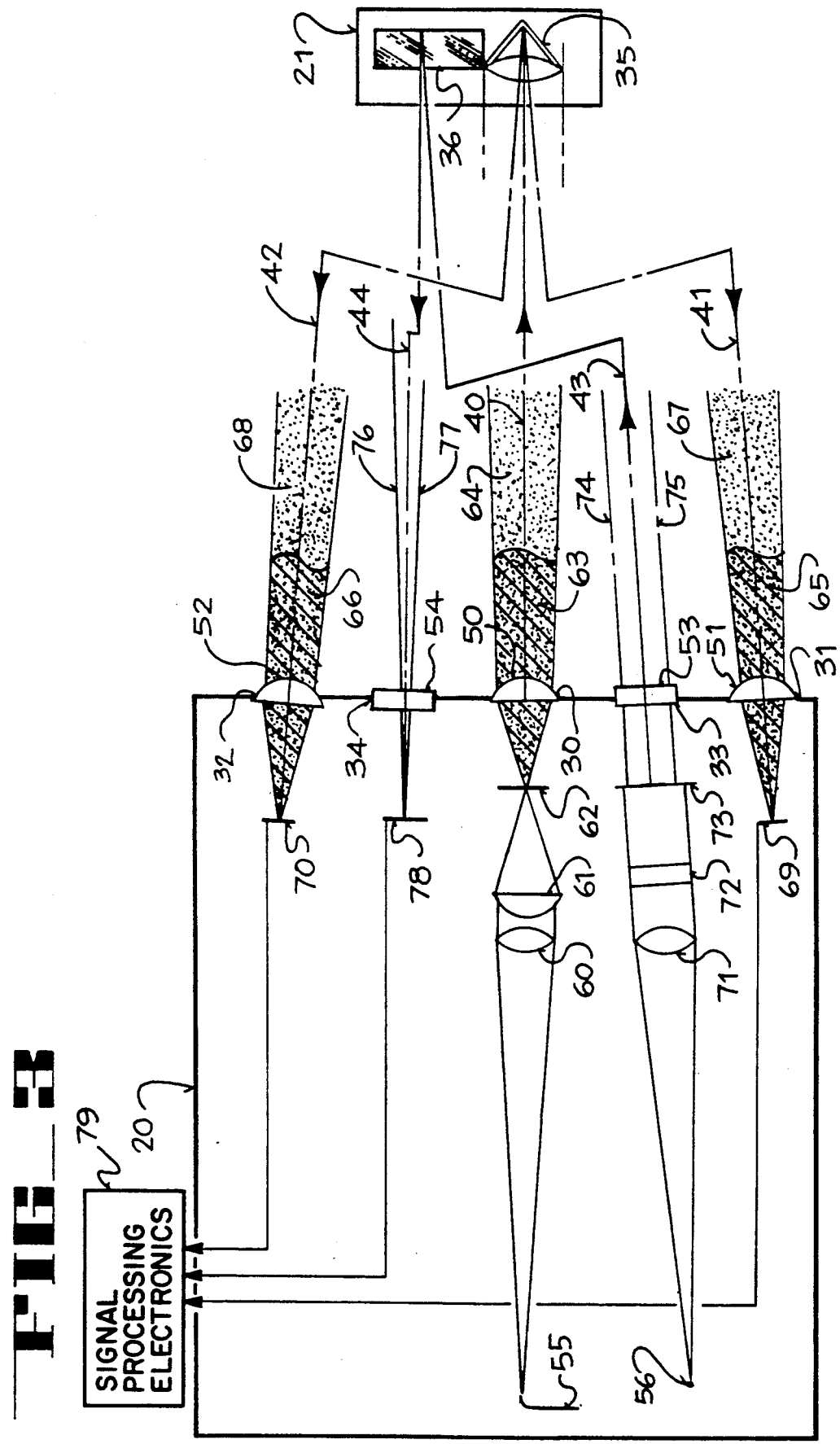
FIG_3

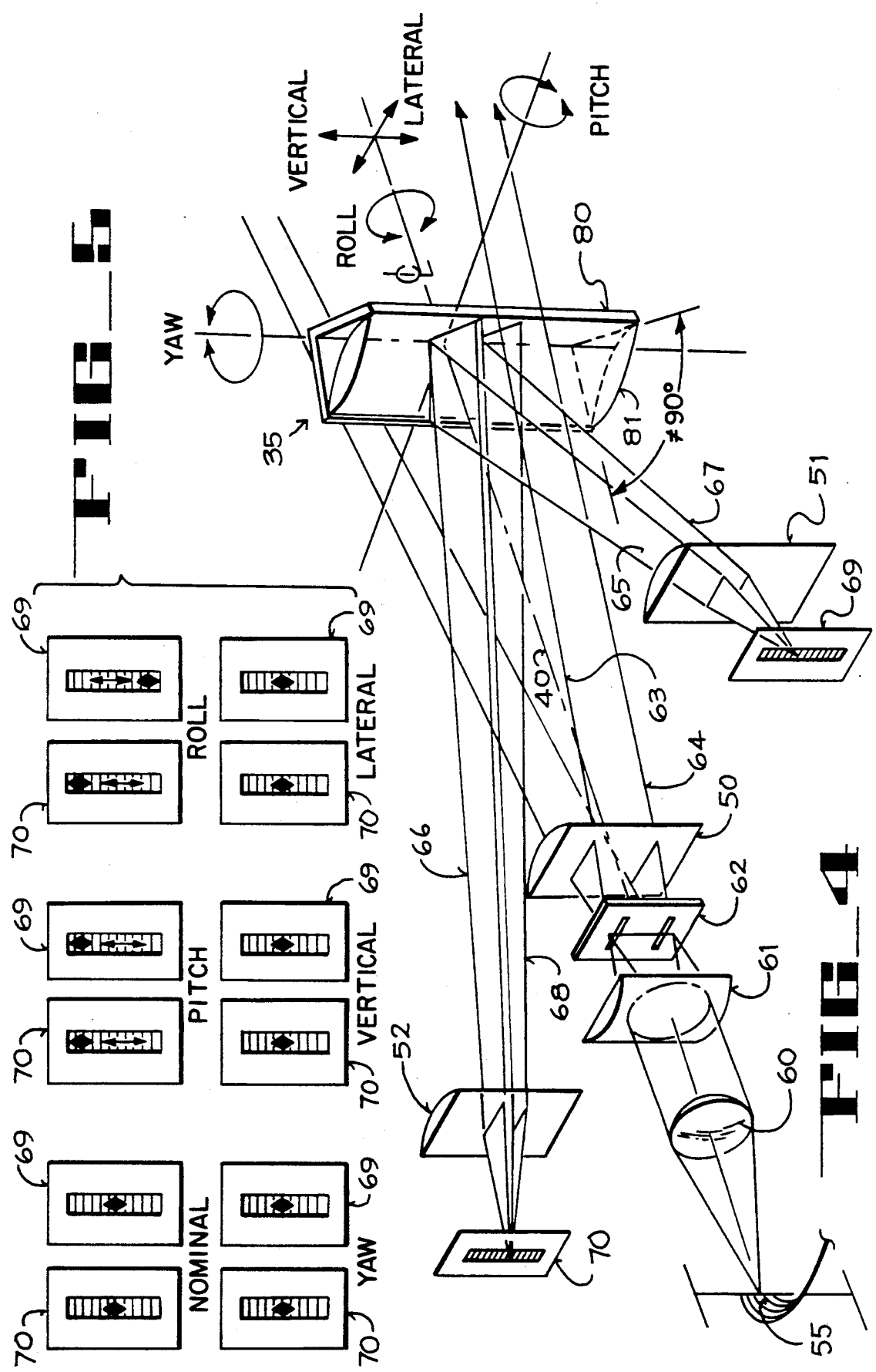

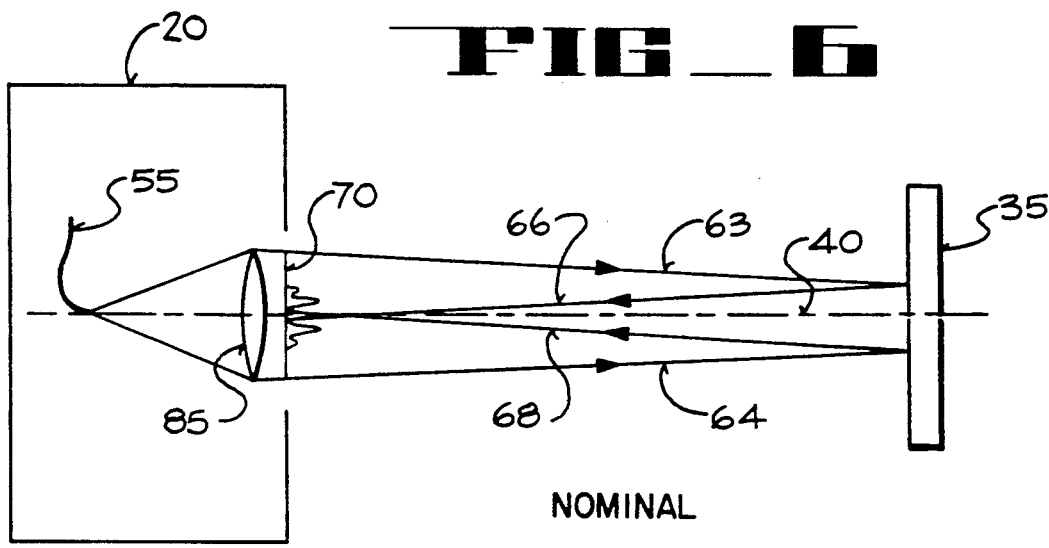
FIG_6 NOMINAL
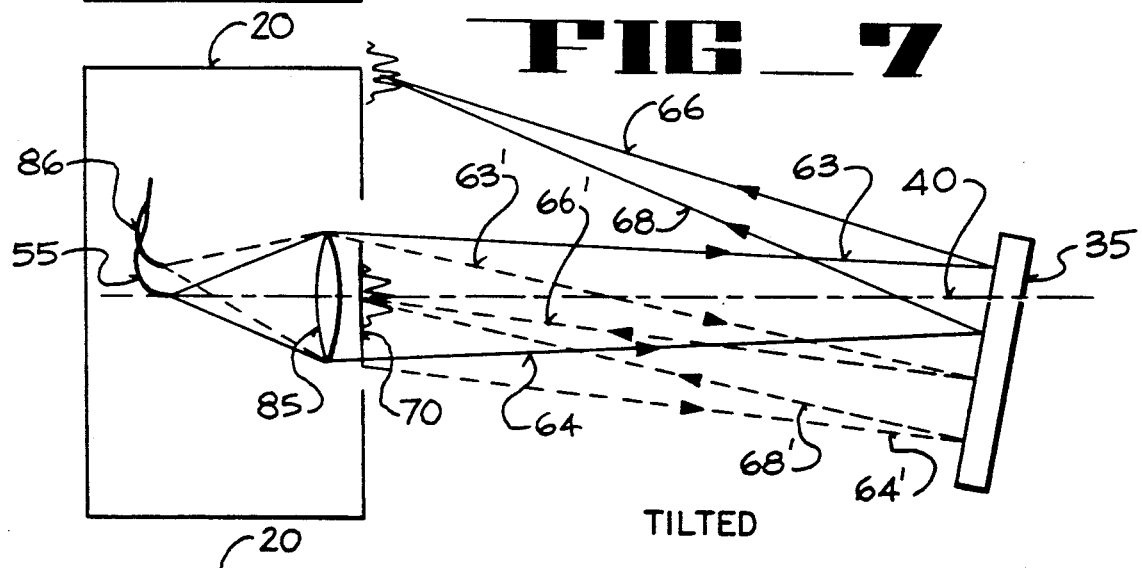
FIG_7 TILTED
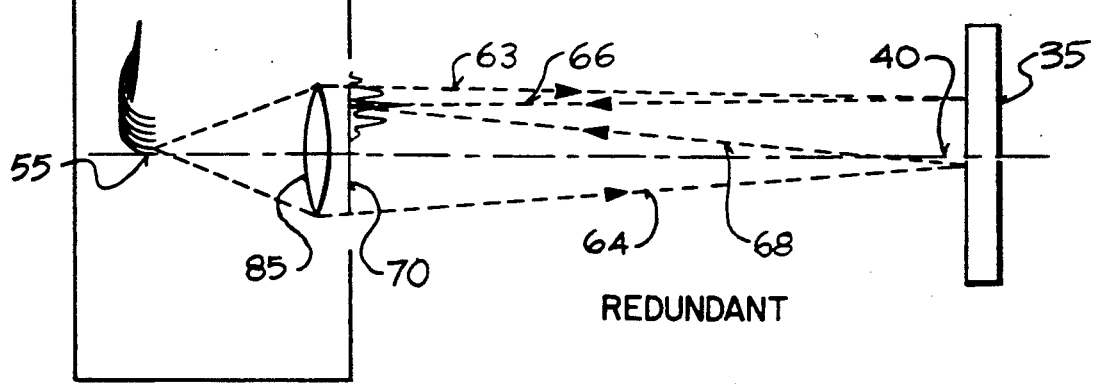
FIG_8 REDUNDANT

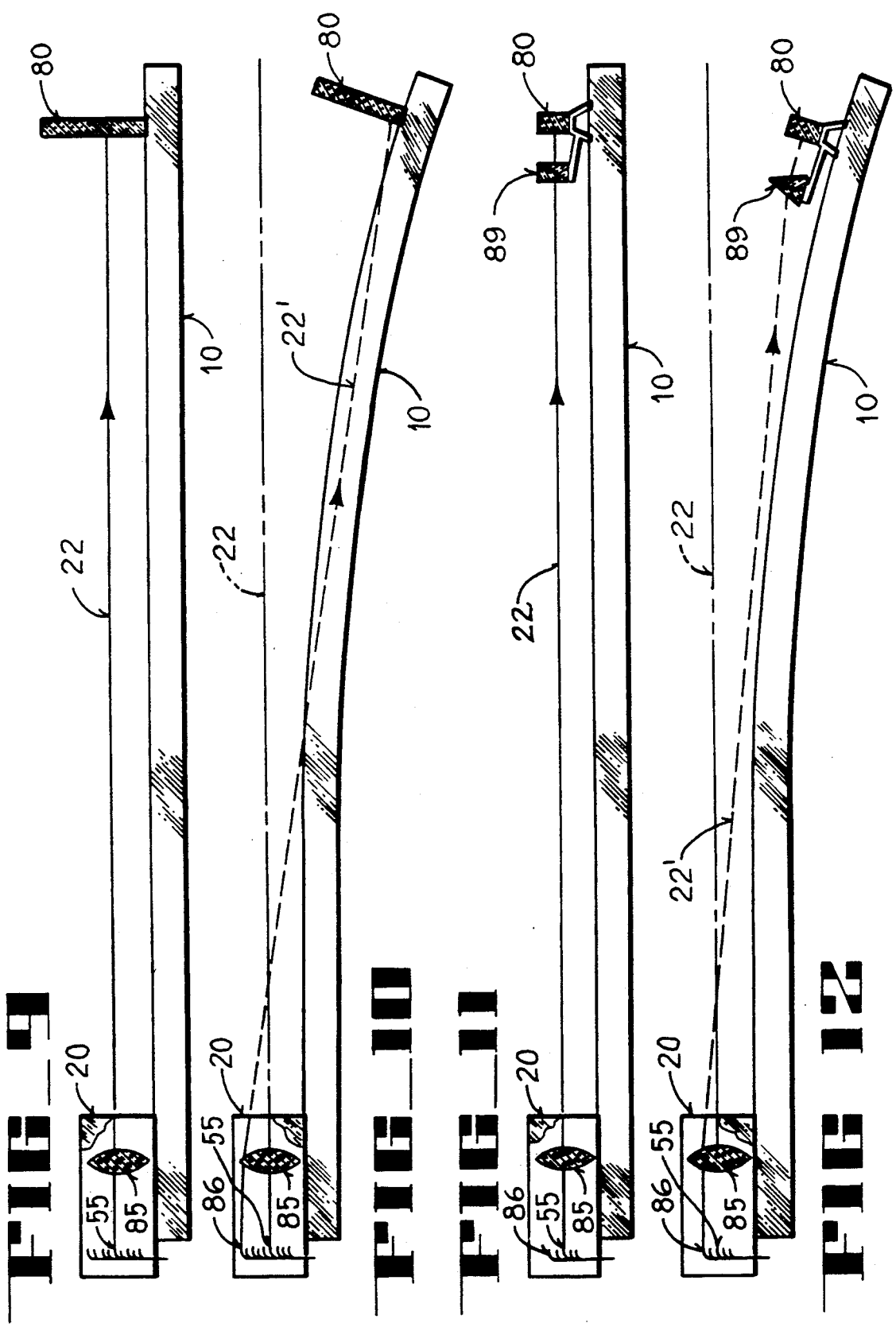

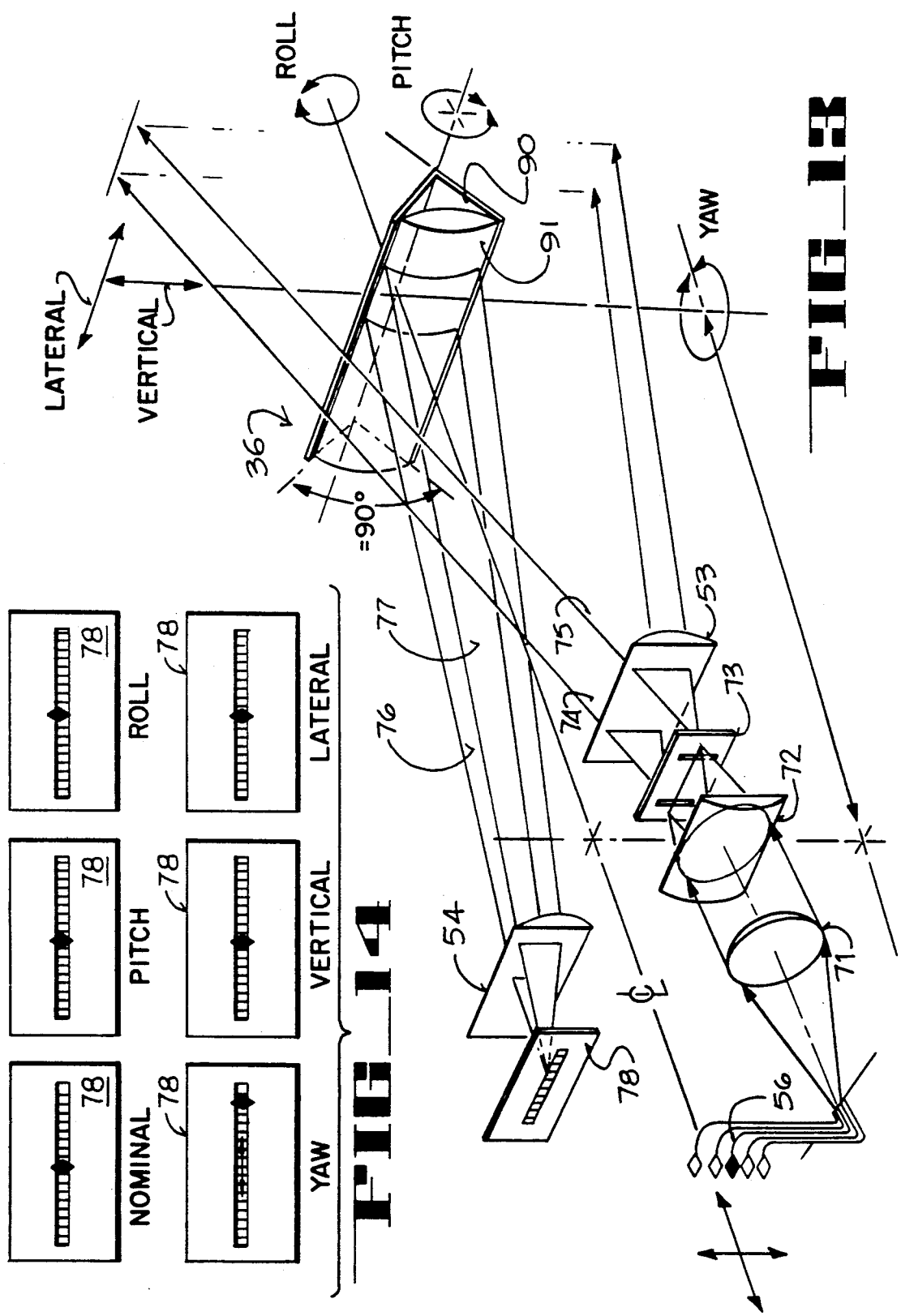

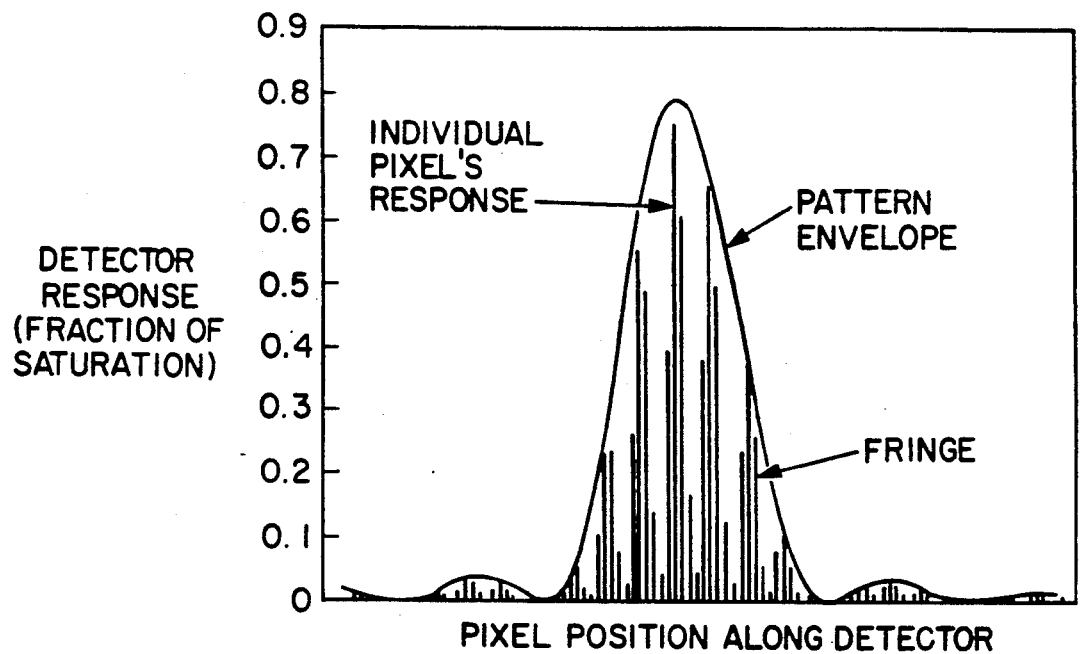
FIG_15
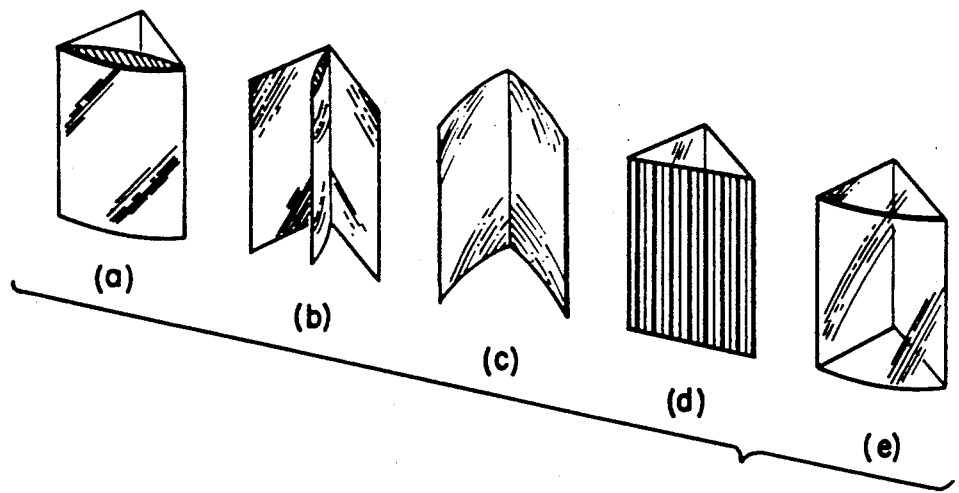
FIG_16

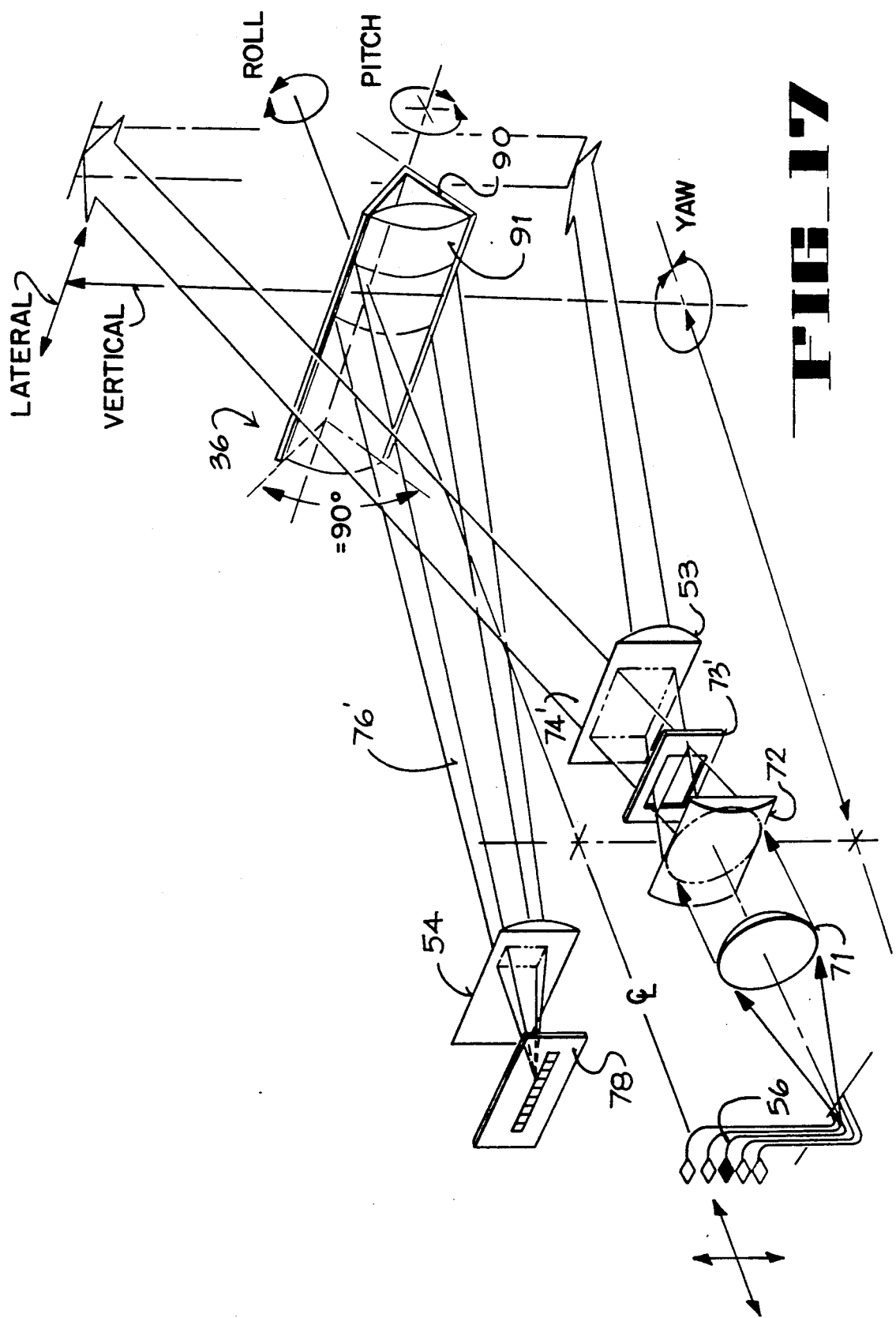

OPTICAL COORDINATE TRANSFER ASSEMBLY

TECHNICAL FIELD

The present invention relates generally to a technique for precisely transferring angular coordinates from one place to another, and more particularly to an electro-optical technique for correlating pointing information between a pair of highly directional systems that are separated from each other by an intervening structure.

BACKGROUND OF THE INVENTION

A mechanical structure for supporting a pair of highly directional systems (e.g., optical telescopes, navigational devices, or high-gain microwave antennas) at a specified separation from each other is ordinarily not sufficiently rigid to maintain perfect correlation between the orientations of the two directional systems relative to one another. Unintended changes are apt to occur in the relative orientations of the pair of spatially separated directional systems mounted on the common supporting structure, because of distortions occurring in the supporting structure due to thermal, aerodynamic, vibrational and/or gravitational effects, and/or due to a phenomenon known as "material creep".

As a consequence of such unintended changes in the relative orientations, data collected or generated by the directional systems are likely to be faulty—unless mechanical or electronic compensation is introduced to nullify the effects of the changes in the relative orientations, or unless the data are adjusted to account for the changes in the relative orientations. Techniques for mechanically and/or electronically compensating for changes in the relative orientations of a pair of directional systems, as well as techniques for adjusting data to account for such changes, require that the angular coordinates of one of the directional systems be precisely correlated in three dimensions with the angular coordinates of the other of the directional systems with a high degree of accuracy.

In recent years, the measurement of distortions in mechanical supporting structures has become an increasingly critical problem in a wide variety of applications, particularly as systems mounted on mechanical supporting structures have become more highly directional. Distortions in mechanical supporting structures can generally be attributed to three categories of effects, viz.:

1) one-time effects (e.g., effects associated with such one-time events as deployment, or curing, or—for extraterrestrial space applications—"gravity release");
2) low-frequency effects (e.g., thermal or tidal effects); and
3) high-frequency effects (e.g., vibrational transients).

A need has been recognized in the prior art for a reliable technique of general applicability for measuring distortions occurring in mechanical supporting structures, which technique can be adapted to the requirements of specific applications by relatively simple adjustments of conventional parameters in accordance with well-known physical principles.

In an article entitled "Three Axis Angular Monitoring System for the Magsat Mission" published in SPIE Proceedings, Vol. 251, July 1980, by P. W. Collyer and F. W. Shenkel, a concept was described for obtaining measurements of displacements in three angular degrees of freedom due to distortions occurring in a satellite designed for the Magsat Mission. These distortions occurring in the satellite, which are characterized as roll-, pitch- and yaw-distortions, are measured with respect to a coordinate system that is internal to the satellite, and are independent of any roll, pitch or yaw that the satellite as a whole might undergo relative to an external coordinate system.

According to the concept proposed by Messrs. Collyer and Shenkel for measuring distortions occurring in the Magsat Mission satellite, a "pitch/yaw sensing head" is mounted at a first end (called the active end) of an elongate supporting structure, and a flat mirror is mounted at the other end (called the passive end) of the elongate supporting structure. The active end of the supporting structure is secured to one side of the satellite, and the passive end thereof is secured to an opposite side of the satellite. The pitch/yaw sensing head comprises a first light source and a first analog area detector. A light beam from the first light source is reflected by the flat mirror so as to form an image of the first light source on the first analog area detector. The position of the image on the first analog area detector provides a measurement of the pitch and yaw attributable to distortions occurring in the supporting structure. In addition, a "twist sensing head" and a first dihedral reflector (i.e., a standard rooftop mirror) are mounted at the active end of the supporting structure, and a cross-oriented second dihedral reflector is mounted at the passive end thereof. The twist sensing head comprises a second light source and a second analog area detector, which are both mounted on one side of the first light source. The first dihedral reflector is mounted on an opposite side of the first light source. A beam of light from the second light source is reflected from the second dihedral reflector to the first dihedral reflector; and then back to the second dihedral reflector for reflection therefrom so as to form an image of the second light source on the second analog area detector. The position of the image on the second analog area detector provides a measurement of the roll attributable to distortions occurring in the supporting structure.

Disadvantages associated with the above-described concept for measuring roll-, pitch- and yaw-distortions include a low data rate (i.e., less than about 5 Hz) inherent in the use of analog area detectors, a significant drift (i.e., about 25 microradians) caused by electronic circuitry for reading the analog area detectors, a restricted dynamic range (i.e., less than about 2 milliradians between points separated by over 10 meters), and relatively poor accuracy (i.e., only about 25 microradian accuracy at best).

Interferometric techniques have also been proposed in the prior art for measuring distortions that occur in a mechanical supporting structure. According to a typical interferometric technique, interferometers (normally about six) using non-parallel laser beams are arranged at specified positions on the supporting structure to enable changes in optical path length from retroreflecting targets mounted at other positions on the supporting structure to be measured by triangulation. In principle, such interferometric measurements can provide sufficient information to determine relative roll-, pitch- and yaw-distortions, as well as to specify relative translational position, between large portions of the supporting structure. However, since triangulation requires that relatively large separations be provided between the interferometers and also that relatively large separations be provided between the retroreflecting targets, it is not generally possible for an interferometric measuring technique to measure very localized distortions in the supporting structure. The accuracy of an interferometric measurement of distortion is highly dependent upon the geometrical arrangement of the interferometers and the retroreflecting targets. In many applications, physical constraints imposed by the environment, or by operating conditions, preclude a geometrical arrangement of the interferometers and retroreflecting targets necessary for obtaining precise interferometric measurements.

To obtain a high degree of accuracy using an interferometric technique for measuring distortions in a mechanical supporting structure, it would ordinarily be necessary to provide a large exclusionary zone (i.e., a zone that is free of components of any kind protruding from a surface) between the interferometers and the retroreflecting targets. Such an exclusionary zone might be difficult or impossible to provide in many applications. Furthermore, to accommodate a reasonable dynamic range of distortions, two-dimensional scanning mirrors and servo-loops might be required for each interferometer to ensure that the individual interferometers track their corresponding targets. Also, it should be noted that interferometers only measure relative linear displacements, and are subject to occasional resets. If any of the laser beams were to fail even momentarily, the accuracy of the measurements of roll, pitch and yaw would be degraded.

SUMMARY OF THE INVENTION

It is an object of the present invention to provide a technique of general applicability for measuring changes in the relative orientations of two spatially separated directional systems.

It is a further object of the present invention to provide an optical technique for measuring angular displacements in up to three degrees of freedom (i.e., roll, pitch and yaw) of a first directional system relative to a second directional system due to distortions occurring in a supporting structure upon which the two directional systems are mounted, where roll is measured about an axis connecting the two directional systems, and pitch and yaw are measured about arbitrarily oriented axes that are orthogonal to each other and to the axis about which roll is measured.

It is likewise an object of the present invention to provide an optical technique whereby angular distortions occurring between two specified points can be measured to sub-microradian accuracy.

It is also an object of the present invention to provide an apparatus for use in high-precision boresighting applications, which apparatus accommodates the occurrence of angular distortions between specified points in a supporting structure due to environmental and/or operational effects. An apparatus according to the present invention, in addition to measuring angular displacements in up to three degrees of freedom (i.e., roll, pitch and yaw) to sub-microradian accuracy, can also achieve data rates exceeding 100 Hz, and can operate with a dynamic range broader than ±5 milliradians between points separated by more than 10 meters. In particular applications, an apparatus according to the present invention could be used to correlate the alignment of components that are not necessarily distant from each other, but that are separated from each other by, e.g., flexures or expansion joints.

DESCRIPTION OF THE DRAWING

FIG. 1 is an illustration in perspective view of an idealized supporting structure with two directional devices supported at opposite ends thereof, which supporting structure can undergo angular displacements in up to three degrees of freedom so as to cause changes in the relative orientations of the two directional devices.

FIG. 2 is a simplified perspective view (partly broken away) of a particular embodiment of an optical coordinate transfer assembly according to the present invention, which comprises members that are co-mounted with corresponding directional devices that are supported at spatially separated locations on an elongate supporting structure.

FIG. 3 is a broken-away plan view of the optical coordinate transfer assembly of FIG. 2 showing an optical alignment sensor co-mounted with a first directional device supported at one end of the supporting structure, and a rooftop-mirror/lens assembly co-mounted with a second directional device supported at an opposite end of the supporting structure.

FIG. 4 is an illustration in perspective view of a roll and pitch sensor subsystem of the optical coordinate transfer assembly of FIG. 3.

FIG. 5 is a schematic illustration of images formed on a pair of detector arrays of the roll and pitch sensor subsystem of FIG. 4 for a condition of zero distortion, and for five different kinds of distortion, occurring in the supporting structure.

FIG. 6 is a schematic view of the optical coordinate transfer assembly of FIG. 2 illustrating formation of an image on a detector array of the roll and pitch sensor subsystem of FIG. 4 for a condition of zero angular distortion occurring in the supporting structure.

FIG. 7 is a schematic view of the optical coordinate transfer assembly of FIG. 2 illustrating formation of an image on a detector array of the roll and pitch sensor subsystem of FIG. 4 for a condition of relatively large pitch distortion occurring in the supporting structure.

FIG. 8 is a schematic view of the optical coordinate transfer assembly of FIG. 2 illustrating formation of an image on a detector array of the roll and pitch sensor subsystem of FIG. 4 for a condition of zero angular distortion occurring in the supporting structure as in FIG. 6, but which for redundancy uses an alternative source of optical radiation to form the image.

FIG. 9 is a simplified schematic illustration in elevation view of the optical coordinate transfer assembly of the present invention showing the optical alignment sensor and the rooftop-mirror/lens assembly mounted on opposite ends of a supporting structure that is undistorted.

FIG. 10 is a simplified schematic illustration as in FIG. 9, except that the supporting structure is shown having undergone an exaggerated distortion.

FIG. 11 is a simplified schematic illustration in elevation view of the optical coordinate transfer assembly of the present invention showing the optical alignment sensor and the rooftop-mirror/lens assembly mounted on opposite ends of a supporting structure that is undistorted, which illustration is similar to FIG. 9 except that a Risley prism is positioned to coact with the rooftop-mirror/lens assembly.

FIG. 12 is a simplified schematic illustration as in FIG. 11, except that the supporting structure is shown having undergone an exaggerated distortion.

FIG. 13 is an illustration in perspective view of a yaw sensor subsystem of the optical coordinate transfer assembly of FIG. 3.

FIG. 14 is a schematic illustration of images formed on a detector array of the yaw sensor subsystem of FIG. 13 for a condition of zero distortion, and for five different kinds of distortion, occurring in the supporting structure.

FIG. 15 is a graphical representation of detector response as a function of pixel position along the detector arrays of the roll and pitch sensor subsystem of FIG. 4 and the yaw sensor subsystem of FIG. 13.

FIG. 16 is an illustration in perspective view of five alternative configurations for a reflector device of the rooftop-mirror/lens assembly of FIG. 3.

FIG. 17 is an illustration in perspective view of a yaw sensor subsystem of an optical coordinate transfer assembly according to the present invention generally as shown in FIG. 13, except that an unpatterned beam of light is reflected to form a spot on the detector array.

BEST MODE OF CARRYING OUT THE INVENTION

In FIG. 1, a supporting structure 10 (which need not be either monolithic or linear) is represented as an elongate parallelepipedal truss. A first directional device 11 (which could be, e.g., a navigational reference, a telescope, or an antenna) is mounted on one end of the supporting structure 10; and a second directional device 12 (which could also be, e.g., a telescope or an antenna) is mounted on an opposite end of the supporting structure 10. An axis 13 indicates the actual orientation of the first directional device 11. In a particular application, the first directional device 11 could be oriented so that the axis 13 is aligned with (i.e., aimed at) a designated target.

Ideally, the supporting structure 10 is prefectly rigid so as to maintain the second directional device 12 in a predetermined position (as shown by solid lines in FIG. 1) that is fixed with respect to the first directional device 11 with a nominal orientation indicated by an axis 14. In a boresighting application, the second directional device 12 would be nominally oriented so that the axis 14 is parallel to the axis 13 when the supporting structure 10 is undistorted. Perfect rigidity of the supporting structure 10 would ensure that the second directional device 12 could be aimed in a direction that is correlated with (or, in a boresighting application, actually determined by) the direction in which the first directional device 11 is aimed.

In practical applications, perfect rigidity of the supporting structure 10 cannot be assumed. Distortions attributable to a variety of different effects tend to occur in the supporting structure 10 between the locations at which the directional devices 11 and 12 are mounted. Such distortions cause the second directional device 12 to undergo angular displacements in three degrees of freedom with respect to a coordinate system associated with the first directional device 11, so that the second directional device 12 assumes an actual orientation (indicated by an axis 14') that can be measured in terms of roll, pitch and yaw relative to the nominal orientation indicated by the axis 14.

In FIG. 1, the position and orientation assumed by the second directional device 12 after the supporting structure 10 has undergone distortion-caused angular displacements are shown in phantom outline by broken lines. The extent of the distortions occurring in the supporting structure 10 is highly exaggerated in FIG. 1 for purposes of illustration. However, in practice, especially in extraterrestrial space applications, even a slight distortion in the supporting structure 10 that is imperceptibly small in the scale of FIG. 1 could cause a significant change in the orientation of the second directional device 12 with respect to the orientation of the first directional device 11.

To maintain precise correlation between the relative orientations of the directional devices 11 and 12 under operational conditions, it is necessary to measure substantially continuously and in real time any angular displacements (i.e., roll, pitch and/or yaw) of the second directional device 12 relative to the coordinate system associated with the first directional device 11. Such continuous roll, pitch and yaw measurements could be used to activate mechanical means for restoring the actual orientation of the second directional device 12 to its nominal orientation, or to implement electronic procedures to compensate for such angular displacements of the second directional device 12. Alternatively, such continuous measurements of roll, pitch and yaw could be used for numerically adjusting data collected or generated by the second directional device 12, whereby distortions occurring in the supporting structure 10 would be taken into account in correlating the relative orientations of the directional devices 11 and 12. The optical coordinate transfer assembly of the present invention enables continuous measurements of angular displacements of the actual orientation of the second directional device 12 with respect to its nominal orientation in any one or more of three degrees of freedom (i.e., roll, pitch and/or yaw) to be obtained in substantially real time.

In the embodiment illustrated in FIG. 1, the optical coordinate transfer assembly of the present invention comprises an optical alignment sensor 20 mounted on (or immediately adjacent) the first directional device 11, and a rooftop-mirror/lens assembly 21 mounted on (or immediately adjacent) the second directional device 12. The optical alignment sensor 20 comprises "active" components (i.e., components that require electrical connections for providing optical power and for performing data processing); but the rooftop-mirror/lens assembly 21 typically comprises only "passive" components (i.e., components that do not require electrical connections for operability). The optical alignment sensor 20 projects beams of electromagnetic radiation (e.g., infrared laser beams) toward the rooftop-mirror/lens assembly 21. In FIG. 1, all of the beams projected from the optical alignment sensor 20 that are incident upon the rooftop-mirror/lens assembly 21 when the second directional device 12 is in the nominal orientation indicated by the axis 14 are represented collectively by ray 22; and all of the beams projected from the optical alignment sensor 20 that are incident upon the rooftop-mirror/lens assembly 21 when the second directional device 12 is in the actual orientation indicated by the axis 14' are represented collectively by ray 22'.

The rooftop-mirror/lens assembly 21 is secured to the second directional device 12 so as to undergo substantially the same angular displacements as the second directional device 12 when distortions occur in the supporting structure 10. As the orientation of the second directional device 12 changes (e.g., from the nominal orientation indicated by the axis 14 to the actual orientation indicated by the axis 14'), portions of the beams of optical radiation projected from the optical alignment sensor 20 are reflected by reflecting components (described hereinafter) of the rooftop-mirror/lens assembly 21 to detector components (described hereinafter) of the optical alignment sensor 20. In an application in which a direct line of sight between the optical alignment sensor 20 and the rooftop-mirror/lens assembly 21 is not possible, and optical device such as a periscope or an extended retroreflector can be used to translate the beams projected from the optical alignment sensor 20 without affecting their relative orientations with respect to each other.

In FIG. 2, interaction between the optical alignment sensor 20 and the rooftop-mirror/lens assembly 21 to produce continuous real-time measurements of angular displacements in three degrees of freedom (i.e., roll, pitch and yaw) of the second directional device 12 relative to its nominal orientation is schematically illustrated. The optical alignment sensor 20 is shown in FIG. 2 as an enclosed casing having five openings 30, 31, 32, 33 and 34, which face toward the rooftop-mirror/lens assembly 21. The rooftop-mirror/lens assembly 21 is shown in broken-away view in FIG. 2 as a housing with an open wall through which a pair of reflector devices 35 and 36 mounted therein face the openings 30, 31, 32, 33 and 34 in the casing of the optical alignment sensor 20. The reflector device 35 comprises a so-called "spoiled" (i.e., nonorthogonal) rooftop mirror and a cylindrical lens, which are described more fully hereinafter. The reflector device 36 comprises a standard (i.e., orthogonal) rooftop mirror and a cylindrical lens, which are likewise described more fully hereinafter.

As illustrated in FIG. 2, a ray 40 (shown as a broken line) generally represents either a single beam, or a bundle of interfering beams, of optical radiation projected from the opening 30 in the casing of the optical alignment sensor 20 toward the rooftop-mirror/lens assembly 21. Use of a bundle of interfering beams rather than a single beam enables greater precision to be achieved in measuring centroid positions of images formed on the detector components of the optical alignment sensor 20. In the particular embodiment of the invention as described hereinafter, the ray 40 represents collectively a pair of interfering beams of optical radiation (e.g., infrared laser beams of wavelength 0.83 micron), which are projected in a manner described hereinafter from the opening 30 toward the reflector device 35 of the rooftop-mirror/lens assembly 21.

The reflector device 35 splits each member of the pair of interfering beams represented by the ray 40 into two beams, so that one member of each pair of beams formed at the reflector device 35 is reflected toward the opening 31 and the other member of each pair of beams formed at the reflector device 35 is reflected toward the opening 32. Thus, as illustrated in FIG. 2, a ray 41 (shown as a broken line) represents collectively the two beams (i.e., one beam from each of the two pairs of beams) that are reflected by the reflector device 35 toward the opening 31, and a ray 42 (likewise shown as a broken line) represents collectively the two beams (i.e., the other beam from each of the two pairs of beams) that are reflected by the reflector device 35 toward the opening 32.

Also illustrated in FIG. 2 is a ray 43 (which is shown as a solid line) that generally represents either a single beam, or a bundle of interfering beams, of optical radiation projected from the opening 33 in the casing of the optical alignment sensor 20 toward the rooftop-mirror/lens assembly 21. In the particular embodiment of the invention as described hereinafter, the ray 43 represents collectively a pair of beams of optical radiation projected in a manner described hereinafter from the opening 33 toward the reflector device 36 of the rooftop-mirror/lens assembly 21. The beams represented by the ray 43 can be (but are not necessarily) of the same wavelength as the beams represented by the ray 40. The reflector device 36 causes the pair of beams represented collectively by the ray 43 to be reflected toward the opening 34 as a corresponding pair of beams represented collectively by a ray 44 (which is also shown as a solid line).

An interior view of the optical alignment sensor 20 is shown in FIG. 3. Cylindrical lenses 50, 51, 52, 53 and 54 are mounted in the openings 30, 31, 32, 33 and 34, respectively, formed in the casing of the optical alignment sensor 20 facing the reflector devices 35 and 36 of the rooftop-mirror/lens assembly 21. Also shown in FIG. 3 are the rays 40, 41 and 42 associated with the reflector device 35, and the rays 43 and 44 associated with the reflector device 36. Interference between the pair of beams projected from the opening 30 is produced in a conventional manner by an optical system that includes a Young's double slit device. Likewise, interference between the pair of beams projected from the opening 33 is produced by a similar optical system that includes a Young's double slit device. Alternative techniques for producing pairs of interfering beams could be used instead of Young's double slit devices. In principle, a single beam rather than a pair of interfering beams projected from each of the openings 30 and 33 could be used in accordance with the present invention. However, use of a pair of interfering beams to form an interference pattern improves precision in measuring centroid positions as described hereinafter.

With particular reference in FIG. 3 to the pair of interfering beams projected from the opening 30, a source of optical radiation (approximating a point source) is located at or near the focus of a spherical converging lens 60. The source of optical radiation might comprise, e.g., a remotely located laser diode connected to an optical fiber 55, which transports the optical radiation to the focus of the lens 60. The lens 60 produces a collimated or slightly converging beam, which is then spread in one dimension by a conventional optical technique—e.g., by means of a cylindrical diverging lens, or by a technique as illustrated in FIG. 3 in which a cylindrical converging lens 61 coacts with the cylindrical lens 50—in order to produce a thin diverging fan-like beam. In principle, it would be sufficient to project a single fan-like beam produced by the cylindrical lenses 61 and 50 toward the rooftop-mirror/lens assembly 21. However, in the preferred embodiment of the invention as illustrated in FIG. 3, the fan-like beam is "patterned" into a pair of interfering fan-like beams 63 and 64, which are projected toward the reflector device 35 of the rooftop-mirror/lens assembly 21.

"Patterning" of the fan-like beam produced by the cylindrical lenses 61 and 50 into the pair of interfering fan-like beams 63 and 64 can be accomplished by means of a Young's double-slit device 62, which in principle can be located anywhere between the spherical collimating lens 60 and the cylindrical diverging lens 50. Preferably, however, the Young's double-slit device 62 is located at an optical waist between the cylindrical lenses 61 and 50 as shown in FIG. 3. In order to increase the dynamic range and/or to compensate for initial misalignments of the optical coordinate transfer assembly, a Risley prism as described hereinafter (not shown in FIG. 3) could optionally be positioned in any one of several possible locations along the paths of the fan-like beams 63 and 64 projected toward the rooftop-mirror/lens assembly 21. A portion of each of the fan-like beams 63 and 64 is incident upon the reflector device 35 along a corresponding line of intersection.

The reflector device 35, as described in greater detail hereinafter, splits the portion of the diverging fan-like beam 63 that is incident thereon into two beams 65 and 66, and focuses them into converging blade-like beams. The reflector device 35 also splits and focuses the portion of the diverging fan-like beam 64 that is incident thereon into two converging blade-like beams 67 and 68. The reflected beams 65 and 67 are directed toward the opening 31, and are focussed by the cylindrical lens 51 onto a linear array 69 of photodetectors (e.g., charge-coupled devices—usually called CCDs). Similarly, the reflected beams 66 and 68 are directed toward the opening 32, and are focussed by the cylindrical lens 52 onto a linear array 70 of photodetectors (e.g., CCDs). Thus, an image of the interference pattern produced by the reflected beams 65 and 67 (which is the same as the interference pattern formed by the incident beams 63 and 64) is formed on the detector array 69; and an image of the interference pattern produced by the reflected beams 66 and 68 (which is likewise the same as the interference pattern formed by the incident beams 63 and 64) is formed on the detector array 70. Optionally, in order to minimize the size of the reflector device 35 for a specified dynamic range, a Risley prism as described hereinafter (not shown in FIG. 3) could be positioned in the beams 63 and 64 adjacent the reflector device 35.

If the cylindrical lenses 61 and 50 were to produce an "unpatterned" fan-like beam (i.e., if a "patterning" device such as the Young's double-slit device 62 were to be omitted), a portion of the fan-like beam would be split by the reflector device 35 into two beams, which would be reflected toward the openings 31 and 32, respectively. If the fan-like beam were to be "patterned" by an appropriate optical device into a bundle consisting of more than two interfering beams for projection toward the rooftop-mirror/lens assembly 21, a portion of each beam of the bundle would be split by the reflector device 35 into a pair of beams. Thus, as many pairs of beams would be formed by the reflector device 35 as there are beams in the bundle that results from the "patterning" of the fan-like beam produced by the lenses 61 and 50. One beam from each of the pairs would be reflected toward the opening 31 to form an image on the detector array 69, and the other beam from each of the pairs would be reflected toward the opening 32 to form an image on the detector array 70.

With particular reference in FIG. 3 to the pair of beams projected from the opening 33, a source of optical radiation (approximating a point source) is located at or near a focus of a spherical converging lens 71. The source of optical radiation might comprise, e.g., a remotely located laser diode connected to an optical fiber 56, which transports the optical radiation to the focus of the lens 71. The lens 71 produces a collimated or slightly converging beam, which is spread in one dimension—preferably by the same technique (as described above) used to spread the beam obtained from the optical radiation provided by the optical fiber 55—in order to produce a thin diverging fan-like beam for projection toward the reflector device 36 of the rooftop-mirror/lens assembly 21.

The beam obtained from the optical fiber 56 could be projected as a single fan-like beam, but is preferably "patterned" into a pair of interfering fan-like beams that are projected toward the reflector device 36. Thus, as shown in FIG. 3, the collimated beam produced by the lens 71 is focussed by a cylindrical lens 72 onto a Young's double-slit device 73 located at an optical waist between the cylindrical lenses 72 and 53. The Young's double-slit device 73 produces a pair of diverging fan-like beams 74 and 75, which are spread by the cylindrical lens 53 so as to be incident upon the reflector device 36 along a corresponding pair of lines of intersection. As shown in FIG. 3, the planes of the fan-like beams 74 and 75 are oriented generally orthogonally with respect to the planes of the fan-like beams 63 and 64. Optionally, a Risley prism as described hereinafter (not shown in FIG. 3) could be positioned in the fan-like beams 74 and 75 adjacent the cylindrical lens 53 in order to increase the dynamic range and to facilitate initial alignment in the same way as indicated above in connection with the Risley prism optionally positioned in the fan-like beams 63 and 64 adjacent the cylindrical lens 50.

The reflector device 36, which is described more fully hereinafter, reflects a portion of each of the diverging fan-like incident beams 74 and 75 as a corresponding member of a pair of converging blade-like beams 76 and 77 directed toward the opening 34. In order to minimize the size of the reflector device 36 for a specified dynamic range, a Risley prism as described hereinafter (not shown in FIG. 3) could optionally be positioned in the beams 74 and 75 adjacent the reflector device 36. Unlike the reflector device 35, which functions as a beamsplitter as well as a reflector, the reflector device 36 does not split the incident beams 74 and 75. As indicated in FIG. 3, the planes of the reflected beams 76 and 77 directed to the opening 34 are oriented generally orthogonally with respect to the planes of the reflected beams 65 and 67 directed to the opening 31 and the planes of the reflected beams 66 and 68 directed to the opening 32.

In FIG. 3, the interfering incident beams 63 and 64 derived from the optical fiber 55, which are projected from the opening 30 in the casing of the optical alignment sensor 20, are represented by the ray 40 in the vicinity of the reflector device 35. Similarly, in FIG. 3, the interfering reflected beams 65 and 67 are represented by the ray 41, and the interfering reflected beams 66 and 68 are represented by the ray 42, in the vicinity of the reflector device 35. The interfering incident beams 74 and 75 derived from the optical fiber 56, which are projected from the opening 33 in the casing of the optical alignment sensor 20, are represented in FIG. 3 by the ray 43 in the vicinity of the reflector device 36. Similarly, the interfering reflected beams 76 and 77 are represented in FIG. 3 by the ray 44 in the vicinity of the reflector device 36.

In a simplified embodiment of the present invention that could be used in applications not requiring a large range of roll, pitch and yaw measurements, the lenses 60 and 71 shown in FIG. 3 (which form beams from optical radiation supplied by the optical fibers 55 and 56, respectively) could be configured to produce converging beams that are incident directly upon reflecting surfaces of the reflector devices 35 and 36, and that are reflected therefrom directly to the corresponding detector arrays 69 and 70 (with respect to the two beams reflected from the reflector device 35) and 78 (with respect to the beam reflected from the reflector device 36). In such a simplified embodiment, the components of the optical alignment sensor 20 as shown in FIG. 3 for diverging and "patterning" the beams formed by the lenses 60 and 71 (i.e., the cylindrical lenses 61 and 50 and the Young's double-slit device 62 with respect to the beam formed by the lens 60, and the cylindrical lenses 72 and 53 and the Young's double-slit device 73 with respect to the beam formed by the lens 71), as well as the cylindrical lenses 51, 52 and 54 and also focussing lens components (described hereinafter) of the reflector devices 35 and 36, would be eliminated.

Power supplies and digital electronic circuitry for operating the CCDs of the detector arrays 69, 70 and 78, and for activating the optical radiation sources (e.g., laser diodes that feed the optical fibers 55 and 56), A' can be housed within the optical alignment sensor 20, or can be housed in a separate enclosure. In particular applications where environmental factors and/or weight considerations so dictate, such power supplies and electronic circuitry can be located quite distant from the first directional device 11.

The components of the optical alignment sensor 20 that are concerned with projecting the ray 40 (i.e., the pair of interfering incident beams 63 and 64) toward the reflector device 35, and with receiving the rays 41 and 42 (i.e., the pair of interfering reflected beams 65 and 67, and the pair of interfering reflected beams 66 and 68) from the reflector device 35, together with the reflector device 35, constitute a subsystem that functions as a roll and pitch sensor. Electrical signals generated (in a manner described hereinafter) by this roll and pitch sensor subsystem provide precise and continuous measurements in real time of the roll and pitch of the second directional device 12 (with which the rooftop-mirror/lens assembly 21 is co-mounted) relative to the nominal orientation thereof. These roll and pitch measurements for the second directional device 12 can be correlated in a conventional manner with the orientation of the first directional device 11 (with which the optical alignment sensor 20 is co-mounted).

The components of the optical alignment sensor 20 that are concerned with projecting the ray 43 (i.e., the pair of interfering incident beams 74 and 75) toward the reflector device 36, and with receiving the ray 44 (i.e., the pair of interfering reflected beams 76 and 77) from the reflector device 36, together with the reflector device 36, constitute a subsystem that functions as a yaw sensor. Electrical signals generated by this yaw sensor subsystem provide precise and continuous measurements in real time of the yaw of the second directional device 12 relative to the nominal orientation thereof. These yaw measurements for the second directional device 12 can likewise be correlated in a conventional manner with the orientation of the first directional device 11.

The roll and pitch sensor subsystem and the yaw sensor subsystem of the present invention can function independently of each other. Thus, in an application requiring measurements of angular displacements in only two degrees of freedom (viz., with respect to an axis connecting the first and second directional devices 11 and 12, and with respect to any designated axis orthogonal to the axis that connects the two directional devices 11 and 12), the roll and pitch sensor subsystem is the only sensor subsystem that needs to be used. In an application requiring measurement of angular displacement in only one degree of freedom (viz., with respect to any axis orthogonal to a line connecting the two directional devices 11 and 12), only the yaw sensor subsystem needs to be used.

In FIG. 4, which illustrates in isolated detail the roll and pitch sensor subsystem of the present invention, the reflector device 35 is shown to comprise a so-called "spoiled" rooftop mirror 80 and a cylindrical lens 81. An ordinary rooftop mirror is a device formed by two planar reflecting surfaces that intersect each other orthogonally (i.e., at precisely a right angle). A beam of optical radiation propagated along a specified path so as to be incident upon either reflecting surface of an ordinary rooftop mirror is reflected therefrom to the other reflecting surface thereof, and is reflected from that other reflecting surface back along an adjacent parallel path—but in a direction opposite the direction of the incident beam. A "spoiled" rooftop mirror, on the other hand, comprises two planar reflecting surfaces that intersect each other at an angle slightly different from a right angle (e.g., 91 degrees). By definition, the two planar reflecting surfaces of a "spoiled" rooftop mirror are slightly nonorthogonal with respect to each other.

The reflector device 35 is oriented such that the line of intersection (called the "ridge line") of the two planar reflecting surfaces that form the spoiled rooftop mirror 80 is nominally parallel to the linear detector arrays 69 and 70. The spoiled rooftop mirror 80 of the reflector device 35 functions both as a beamsplitter and as a reflector. The incident beams 63 and 64 are split and "folded" in two different directions by the spoiled rooftop mirror 80 so as to produce the pair of reflected beams 65 and 67 that are directed toward the opening 31 in which the cylindrical lens 51 is mounted, and so as to produce the pair of reflected beams 66 and 68 that are directed toward the opening 32 in which the cylindrical lens 52 is mounted.

As illustrated in FIG. 4, one portion of the incident beam 63 is reflected toward the cylindrical lens 51 as the reflected beam 65, and another portion of the incident beam 63 is reflected toward the cylindrical lens 52 as the reflected beam 66. Similarly, one portion of the incident beam 64 is reflected toward the cylindrical lens 51 as the reflected beam 67, and another portion of the incident beam 64 is reflected toward the cylindrical lens 52 as the reflected beam 68. In general, the angular divergence of the reflected beams 65 and 67 is equal—but symmetrically opposite—to the angular divergence of the reflected beams 66 and 68 from the direction of propagation of the incident beams 63 and 64 (represented by the ray 40).

The reflected beams 65 and 67 converge toward each other, because the lens 60 is a converging lens. The cylindrical lens 81 and the cylindrical lens 51 act together to focus the converging reflected beams 65 and 67 so as to form an image on a particular portion of the detector array 69. Similarly, the cylindrical lens 81 and the cylindrical lens 52 act together to focus the converging reflected beams 66 and 68 so as to form an image on a particular portion of the detector array 70.

The particular photodetector (or set of photodetectors) in each of the detector arrays 69 and 70 on which an image is formed at any given time depends upon the orientation of the spoiled rooftop mirror 80 relative to the detector arrays 69 and 70 at that given time. Since the reflector device 35 is securely installed as a component of the rooftop-mirror/lens assembly 21, which is co-mounted with the second directional device 12, and since the detector arrays 69 and 70 are securely installed as components of the optical alignment sensor 20, which is co-mounted with the first directional device 11, the particular photodetector (or set of photodetectors) in each of the detector arrays 69 and 70 on which an image is formed at any given time is therefore determined by the orientation of the second directional device 12 relative to the first directional device 11 at that given time.

When the supporting structure 10 is in a condition of zero angular distortion, the reflector device 35 assumes a particular orientation with respect to a line connecting the midpoints of the detector arrays 69 and 70 (i.e., a reference orientation) that corresponds to the nominal orientation of the second directional device 12. The reference orientation of the reflector device 35 can be described in relation to a three-dimensional orthogonal Cartesian coordinate system (as illustrated in FIG. 4), whose axes are:

(1) a "roll" axis, which coincides with the center line of the roll and pitch sensor subsystem (i.e., the ray 40) coinciding with the optic axis of those optical elements (viz., the collimating lens 60, the cylindrical lens 61, the Young's double-slit device 62, and the cylindrical lens 50) that produce the interfering beams 63 and 64;

(2) a "pitch" axis, which is orthogonal to the roll axis and parallel to a line connecting the midpoints of the linear detector arrays 69 and 70; and (3) a "yaw" axis, which is orthogonal to the roll and pitch axes, and thus is parallel to the linear detector arrays 69 and 70.

When the reflector device 35 assumes its reference orientation (i.e., when the supporting structure 10 is in a condition of zero angular distortion), the reflector device 35 exhibits zero angular displacement with respect to the roll-, pitch- and yaw-axes.

The images formed on the detector arrays 69 and 70 appear as interference patterns in the preferred embodiment of the invention illustrated in FIG. 4. However, in a simplified embodiment in which unpatterned beams are reflected to the detector arrays 69 and 70, the images formed on the detector arrays 69 and 70 would be spots of light. In FIG. 5, centroid positions of the images formed on the detector arrays 69 and 70 are illustrated schematically for a condition of zero distortion of the supporting structure 10, and for five different kinds of distortion occurring in the supporting structure 10 that affect the orientation of the second directional device 12 relative to the first directional device 11. From the centroid positions of the images formed on the detector arrays 69 and 70, precise measurements can be made of changes in orientation of the second directional device 12 relative to the first directional device 11 due to angular distortions occurring in the supporting structure 10.

The first illustration in FIG. 5, which is labelled "NOMINAL", shows centroid positions of the images formed on the detector arrays 69 and 70 when the supporting structure 10 is in a condition of zero angular distortion. Thus, for the condition of zero angular distortion, the centroid position of the images are located on central photodetector elements of the linear arrays of photodetectors (e.g., CCDs) comprising the detector arrays 69 and 70.

The second illustration in FIG. 5, which is labelled "PITCH", shows centroid positions of the images formed on the detector arrays 69 and 70 when the supporting structure 10 undergoes an angular distortion in a first degree of freedom (and only in that first degree of freedom) such that the reflector device 35 experiences an angular displacement about the pitch axis. When the reflector device 35 (and hence also the second directional device 12) experience a change in orientation due solely to this pitch displacement, the centroid positions of the images are formed on photodetector elements located on the same side of but away from the central photodetector elements of the linear arrays of photodetectors (e.g., CCDs) comprising the detector arrays 69 and 70. The extent to which the centroid positions of the images are separated from the central photodetector elements of the detector arrays 69 and 70 provides an accurate measurement of the change in orientation of the second directional device 12 relative to the first directional device 11 due to the pitch displacement resulting from angular distortion of the supporting structure 10.

The third illustration in FIG. 5, which is labelled "ROLL", shows centroid positions of the images formed on the detector arrays 69 and 70 when the supporting structure 10 undergoes an angular distortion in a second degree of freedom (and only in that second degree of freedom) such that the reflector device 35 experiences an angular displacement about the roll axis. When the reflector device 35 (and hence also the second directional device 12) experience a change in orientation due solely to this roll displacement, the centroid positions of the images are formed on photodetector elements located on opposite sides of the central photodetector elements of the linear arrays of photodetectors (e.g., CCDs) comprising the detector arrays 69 and 70. The extent to which the centroid position of the image on the linear detector array 69 is separated from the centroid position on the image on the linear detector array 70 provides an accurate measurement of the change in orientation of the second directional device 12 relative to the first directional device 11 due to the roll displacement resulting from angular distortion of the supporting structure 10.

When the angular distortions occurring in the supporting structure 10 are such that the reflector device 35 (and hence also the second directional device 12) experience both a pitch displacement and a roll displacement simultaneously, the centroid positions of the images are formed on photodetector elements that are located at different separations from the central photodetector elements of the linear arrays comprising the detector arrays 69 and 70. Thus, when the reflector device 35 undergoes both pitch and roll displacements simultaneously, precise measurement of the change in orientation of the second directional device 12 relative to the first directional device 11 due to the pitch displacement can be determined from the average value of the separations of the centroid positions of the images from the central photodetector elements on the two detector arrays 69 and 70, and precise measurement of the change in orientation of the second directional device 12 relative to the first directional device 11 due to the roll displacement can be determined from the difference between the centroid positions of the images on the two detector arrays 69 and 70.

The fourth illustration in FIG. 5, which is labelled "YAW", shows centroid positions of the images formed on the detector arrays 69 and 70 when the supporting structure 10 undergoes an angular distortion in a third degree of freedom (and only in that third degree of freedom) such that the reflector device 35 experiences an angular displacement about the yaw axis. A comparison of the fourth (i.e., "YAW") illustration with the first (i.e., "NOMINAL") illustration in FIG. 5 shows that the roll and pitch sensor subsystem does not measure angular displacements of the reflector device 35 about the yaw axis. Measurements of roll and pitch are independent of any yaw distortion occurring in the supporting structure 10.

The fifth and sixth illustrations in FIG. 5, which are labelled "VERTICAL" and "LATERAL", respectively, show centroid positions of the images formed on the detector arrays 69 and 70 when the supporting structure 10 undergoes angular distortions that effectively cancel each other so as to result in no net angular distortion, but which cause a concomitant translational displacement of the reflector device 35 in a direction orthogonal to the roll axis. It is apparent from a comparison of the fifth and sixth (i.e., "VERTICAL" and "LATERAL") illustrations with the first (i.e., "NOMINAL") illustration in FIG. 5 that the roll and pitch sensor subsystem is insensitive to any translational displacement orthogonal to the roll axis.

A sixth kind of distortion that might occur in the supporting structure 10 that could change the orientation of the second directional device 12 relative to the first directional device 11 is a longitudinal distortion that causes a radial "in/out" displacement of the second directional device 12 relative to the first directional device 11. A radial displacement might be small enough to have only a relatively minor "cross-coupling" effect on the optical coordinate transfer assembly, which would merely change the overall scale factor. On the other hand, a radial displacement could in principle be large enough to defocus the images formed on the detector arrays 69 and 70, or to cause the images to miss the detector arrays 69 and 70 entirely. However, for presently contemplated applications of the present invention, the only significant mode of generating radial displacements of the supporting structure 10 would be thermal expansion, which would ordinarily produce tolerably small radial displacements that result in negligibly small measurement errors. The effect of radial displacement of the supporting structure 10 is not illustrated in FIG. 5.

As indicated in FIGS. 4 and 5, the detector arrays 69 and 70 are relatively short in length. However, a length for the detector arrays 69 and 70 that is short enough to be "convenient" for mechanical purposes is apt to be so short that, if the reflector device 35 (and hence the second directional device 12) were to undergo more than a certain amount of pitch, the centroid positions of the images to be formed on the detector arrays 69 and 70 would go "off scale". To accommodate larger amounts of pitch without requiring that the detector arrays 69 and 70 be especially long, the beams 63 and 64 can be deflected by a Risley prism such that the reflected beams 65 and 67 are directed to the detector array 69, and the reflected beams 66 and 68 are directed to the detector array 70. Alternatively, as indicated in FIG. 4, a set of optical fibers of which the optical fiber 55 is only one member could be used so that, for any given amount of pitch within a range of pitch that the reflector device 35 could be expected to undergo, at least one of the optical fibers of the set (if not the optical fiber 55) is appropriately positioned so that optical radiation supplied thereby is collimated by the lens 60 along a path through the cylindrical lenses 61 and 50 and the intervening Young's double-slit device 62 so that the resulting beams, when reflected by the reflector device 35, are focussed on the detector arrays 69 and 70. Unless the optical fiber 55 is used, the path of the optical radiation that results in the beams that are focussed on the detector arrays 69 and 70 is nonparallel to the optic axis of the lens 60.

As illustrated in FIG. 4, all the optical fibers comprising the set of which the particular optical fiber 55 is a member are positioned so as to terminate on a line parallel to the linear detector arrays 69 and 70. The optical fiber 55 in particular is positioned so that, when the actual orientation of the second directional device 12 coincides with its nominal orientation (i.e., when the reflector device 35 is perpendicular to the optic axis of the aforementioned optical elements that produce the interfering beams 63 and 64), the interference pattern formed by the beams 63 and 64 is imaged on the central photodetector elements of the detector arrays 69 and 70. The other optical fibers of the set are positioned so that an interference pattern formed by another pair of interfering beams derived from one of the other members of the set is imaged on the linear arrays of photodetector elements of the detector arrays 69 and 70 for any pitch of the reflector device 35 that might occur as a result of an actual distortion within a range of possible distortions that could reasonably be expected to occur in the supporting structure 10.

In FIG. 6, the incident beams 63 and 64 as well as the reflected beams 66 and 68 are shown as solid-line rays, and the optical components that produce the incident beams 63 and 64 are schematically represented by a lens 85. As illustrated in FIG. 6, the optical fiber 55 is disposed so that the centroid position of the interference pattern formed on the detector array 70 by the converging reflected beams 66 and 68 is located on the central photodetector element of the linear array of photodetectors comprising the detector array 70. The centroid position of the interference pattern illustrated in FIG. 6 indicates a condition in which the actual orientation of the second directional device 12 coincides with its nominal orientation. Concomitantly, when the actual orientation and the nominal orientation of the second directional device 12 coincide with each other, the centroid position of the interference pattern formed on the detector array 69 (not shown in FIG. 6) by the converging reflected beams 65 and 67 is located on the central photodetector element of the linear array of photodetector comprising the detector array 69.

However, as illustrated schematically in FIG. 7, when the reflector device 35 is tilted through a relatively large angle away from perpendicularity with respect to the optic axis of the optical elements represented by the lens 85 (i.e., when the second directional device 12 undergoes a relatively large pitch displacement), the centroid position of the interference pattern formed on the detector array 70 by the converging reflected beams 66 and 68 is located "off scale"—i.e., at a focus located off the detector array 70. Of course, if the detector array 70 were sufficiently long to ensure that a photodetector element thereof is present wherever the reflected beams 66 and 68 are focussed, and likewise if the detector array 69 were sufficiently long to ensure that a photodetector element thereof is present wherever the reflected beams 65 and 67 are focussed, even for a very large tilt of the reflector device 35 (corresponding to a very large pitch displacement of the second directional device 12), then the single optical fiber 55 would be sufficient to provide the optical radiation necessary to generate the pair of interfering beams that are to be reflected to the detector arrays 69 and 70 by the tilted reflector device 35. In practice, however, it is not generally desirable to require extremely long detector arrays 69 and 70 to accommodate large angular displacements of the second directional device 12.

A large tilt of the reflector device 35 causes the incident beams 63 and 64 (shown in FIG. 7 as solid-line rays), which are derived from the optical fiber 55, to be reflected through such a large angle that the centroid position of the interference pattern produced by the corresponding reflected beams 66 and 68 (also shown in FIG. 7 as solidline rays) is focussed off the detector array 70. However, the same large tilt of the reflector device 35 enables another pair of incident beams 63' and 64' (shown in FIG. 7 as broken-line rays), which are derived from another optical fiber 86, to be reflected through a relatively small angle such that the centroid position of the interference pattern produced by corresponding reflected beams 66' and 68' (also shown in FIG. 7 as broken-line rays) is focussed on the detector array 70.

The optical fibers 55 and 86 illustrated in FIG. 7 are just two members of the set of optical fibers that provide point sources of optical radiation for the optical components represented by the lens 85. All the optical fibers of the set (including the optical fibers 55 and 86) are disposed in such a way that, for any particular condition of tilt of the reflector device 35, a pair of interfering beams derived from a particular one of the optical fibers is incident upon the reflector device 35 at the precise angle required for one pair of beams reflected from the reflector device 35 to form an interference pattern whose centroid position is located on the detector array 70. Similarly, for the same condition of tilt of the reflector device 35, another pair of beams reflected from the reflector 35 forms an interference pattern whose centroid position is located on the detector array 69.

In order to improve reliability by enabling the optical coordinate transfer system to operate even if one or more of the sources of optical radiation were to fail, it is within the contemplation of the present invention for the optical fibers (including the optical fibers 55 and 86) to be positioned so that, for any condition of tilt of the reflector device 35, one of the optical fibers would be positioned so as to form an interference pattern whose centroid is located on a central portion of the detector array 70, and another of the optical fibers would be positioned so as to form an interference pattern whose centroid is located somewhere else on the detector array 70. Thus, as indicated in FIG. 8, redundant interference patterns can be formed on the detector array 70. Likewise, redundant interference patterns can be formed on the detector array 69.

Instead of using a set comprising a plurality of optical fibers for ensuring that the centroid positions of the interference patterns formed by the beams reflected from the reflector device 35 are located on the detector arrays 69 and 70, an alternative technique for accomplishing the same result would be to use a source of electromagnetic radiation (e.g., a laser diode coupled to a single optical fiber) in combination with a means such as a stepping motor or a piezoelectric device for moving the source of radiation through a range of positions. Thus, for any particular condition of tilt of the reflector device 35, a corresponding position for the output end of the optical fiber can be obtained such that optical radiation supplied by the optical fiber can be collimated by the lens 60 along a path that is nonparallel to the optic axis thereof, and passed through the cylindrical lenses 61 and 50 and the intervening Young's double-slit device 62 so that the resulting beams, when reflected by the reflector device 35, are focussed on the detector arrays 69 and 70.

Another alternative technique for ensuring that the centroid positions of the interference patterns formed by the beams reflected from the reflector device 35 are located on the detector arrays 69 and 70 would be to use a Risley prism (as mentioned above) in conjunction with either a single optical fiber or a set of optical fibers. A Risley prism is a device comprising a pair of prism elements that are arranged with respect to each other so as to be functionally equivalent to a single prism with variable power. One of the prism elements of a Risley prism can be rotated relative to the other (either manually or by means of an electric motor) so as to enable a net power to be selected within a range from zero to a value much higher than the power of either prism element alone. Also, both prism elements of a Risley prism can be rotated as a unit to provide beam deflection in any direction.

When using a Risley prism in practicing the present invention, the power selected for the Risley prism would be such that the interfering beams incident upon the reflector device 35 are deviated through a sufficient angle to ensure that the corresponding beams reflected from the reflector device 35 are directed to the detector arrays 69 and 70. An angle encoder could be used in conjunction with the Risley prism to provide a measurement of the beam deflection, which could be combined with positional information for the images formed on the detector arrays 69 and 70 to obtain a measurement of the orientation of the second directional device 12 relative to the first directional device 11.

FIG. 9 schematically illustrates the optical alignment sensor 20 mounted on one end, and the spoiled rooftop mirror 80 of the reflector device 35 of the rooftop-mirror/lens assembly 21 mounted on the opposite end, of the supporting structure 10, where the supporting structure 10 is in a condition of substantially zero distortion. As illustrated in FIG. 1, the beams (collectively represented by the ray 22) projected from the optical alignment sensor 20 are produced from radiation that is supplied by the particular optical fiber 55 that is aligned with the optic axis of the optical components (collectively represented by the lens 85) of the optical alignment sensor 20. The spoiled rooftop mirror 80 is mounted so that the ridge line thereof is perpendicular to the ray 22 in the plane of the ridge line and the ray 22, whereby (since the supporting structure 10 has undergone substantially zero distortion) the spoiled rooftop mirror 80 is in position to intercept the ray 22.

FIG. 10 schematically illustrates the optical alignment sensor 20 mounted on one end, and the spoiled rooftop mirror 80 mounted on the opposite end, of the supporting structure 10, as in FIG. 9. However, the supporting structure 10 is shown in FIG. 10 as having undergone a very large distortion, which is exaggerated in the drawing for didactic purposes. The distortion occurring in the supporting structure 10 causes a sufficient angular displacement of the reflector device 35 to take the spoiled rooftop mirror 80 out of the path of the beams represented by the ray 22. However, radiation supplied by another member of the set of optical fibers (viz., the optical fiber 86, which is positioned off-axis with respect to the optic axis of the optical components represented by the lens 85) produces the beams (represented collectively by the ray 22') that are projected from the optical alignment sensor 20 so as to be incident upon the spoiled rooftop mirror 80—provided that the spoiled rooftop mirror 80 is long enough to intercept the ray 22'. If the ray 22' were approximately perpendicular to the ridge line of the spoiled rooftop mirror 80 when the reflector device 35 is in its angularly displaced position, the beams represented by the ray 22' would be reflected to approximately the central portions of the detector arrays 69 and 70 (as illustrated in FIG. 4). However, as the deviation from perpendicularity increases for the angle of incidence of the ray 22' upon the spoiled rooftop mirror 80, the likelihood also increases that the beams represented by the ray 22' would be reflected to somewhere other than the detector arrays 69 and 70 (i.e., "off-scale")—unless the detector arrays 69 and 70 are extremely long.

FIG. 11 is essentially a reprise of FIG. 9 with the addition of a Risley prism 89 mounted in front of the spoiled rooftop mirror 80. Since the supporting structure 10 is undistorted in the illustration of FIG. 11, the Risley prism 89 is not needed to deflect the beams represented by the ray 22 toward the spoiled rooftop mirror 80. Accordingly, the prism elements comprising the Risley prism 89 are positioned with respect to each other so that the Risley prism 89 has a net power of zero. However, if the spoiled rooftop mirror 80 were to undergo an angular displacement due to a distortion occurring in the supporting structure 10, one of the prism elements of the Risley prism 89 could be rotated with respect to the other so as to deflect the beams represented by the ray 22 as necessary so as to be incident upon the spoiled rooftop mirror 80 (provided that the reflector device 35 is long enough to intercept the deflected beams). Use of the Risley prism 89 to deflect the ray 22 allows the spoiled rooftop mirror 80 to be shorter in length than would otherwise be necessary to accommodate relatively small distortions in the supporting structure 10.

FIG. 12 is essentially a reprise of FIG. 10 with the addition of the Risley prism 89 mounted in front of the spoiled rooftop mirror 80. As illustrated in FIGS. 10 and 12, the supporting structure 10 has undergone a distortion that is sufficiently large to take the spoiled rooftop mirror 80 out of the path of the beams represented by the ray 22. In FIG. 10, the beams represented by the ray 22' (which are produced from radiation supplied by the off-axis optical fiber 86) are seen to be incident upon the spoiled rooftop mirror 80, but only because the spoiled rooftop mirror 80 is long enough to intercept the ray 22'. In FIG. 12, the Risley prism 89 is shown having a power that is large enough to cause a sufficient deflection of the ray 22' so that it is substantially perpendicular to the spoiled rooftop mirror 80, which thus can be shorter in length than would be possible if the ray 22' were undeflected as in FIG. 10.

Applications are contemplated for the present invention in which another Risley prism (not shown in the drawing) would also be mounted in the path of the beams projected from the optical alignment sensor 20 in order to adjust the deflection of the beams on occasion as necessary to compensate for "one-time" distortion effects (e.g., gravity-release and cool-down). In such applications, the set of optical fibers providing the point sources of optical radiation that are located at different positions with respect to the optic axis of the beam-producing optical components (as represented by the lens 85 in FIGS. 9-12) would not be used to effect the occasional beam deflections that might be needed to compensate for "one-time" distortions, but rather would be used only to accommodate a predetermined dynamic range of distortions associated with continuous operation of the optical coordinate transfer assembly. When such an additional Risley prism is used to compensate for "one-time" distortion effects, an angle encoder would ordinarily not be needed in conjunction with the Risley prism 89 as described above with reference to FIGS. 11 and 12.

The overall dimensions of the rooftop-mirror/lens assembly 21 are affected by the dimensions of the reflector devices 35 and 36. In a typical configuration, the rooftop-mirror/lens assembly 21 would have a "vertical" dimension at least equal to the length of the reflector device 35, and a "horizontal" dimension at least equal to the length of the reflector device 36 plus the width of the reflector device 35. If some other optical device such as a periscope or an extended retroreflector were needed to accommodate any lack of direct line-of-sight between the optical alignment sensor 20 and the rooftop-mirror/lens assembly 21, that other optical device (if located near the second directional device 12) would require an operational aperture of approximately the same transverse dimension as the rooftop-mirror/lens assembly 21. Thus, use of the Risley prism 89 mounted in front of the spoiled rooftop mirror 80 to accommodate an expected dynamic range of distortions would significantly reduce the overall dimensions of the rooftop-mirror/lens assembly 21. Furthermore, use of such Risley prisms would provide savings in cost and weight by reducing the size of any required optical device such as a periscope or an extended retroreflector. Also, use of such Risley prisms would allow fewer optical fibers to be used for providing the point sources of optical radiation, thereby reducing the transverse dimensions of the beams represented by the rays 22 and 22'.

In FIG. 13, which illustrates in isolated detail the yaw sensor subsystem of the present invention, the reflector device 36 is shown to comprise a regular rooftop mirror 90 and a cylindrical lens 91. By definition, the two planar reflecting surfaces of the rooftop mirror 90 are orthogonal to each other. The reflector device 36 is oriented so that the ridge line of the rooftop mirror 90 is approximately parallel to the linear detector array 78.

The rooftop mirror 90 (which functions only as a reflector and does not have a beamsplitting function) causes portions of the converging beams 74 and 75 that are projected from the opening 33 (as shown in FIG. 3) to be reflected as the corresponding beams 76 and 77, which converge toward the opening 34. The cylindrical lens 91 and the cylindrical lens 54 act together to focus the beams 76 and 77 onto the detector array 78. In effect, the reflector device 36 "folds" the converging beams 74 and 75 so as to form an interference pattern on the detector array 78. The particular photodetector (or set of photodetectors) of the detector array 78 on which the interference pattern is formed at any given time is determined by the orientation of the second directional device 12 relative to the first directional device 11 at that given time.

In a simplified embodiment of the present invention, which could be used in applications in which a high degree of precision in the yaw measurement is not required, a single unpatterned beam could be projected from the opening 33 to the reflector device 36 for reflection therefrom so as to form a corresponding unpatterned image (i.e., a spot of light) on the detector array 78. Such a simplification of the yaw sensor subsystem would be analogous to a similar simplification of the roll and pitch sensor subsystem, as discussed above. Similarly, one or more Risley prisms could be used in the yaw sensor subsystem in a manner analogous to the use of Risley prisms as discussed above in connection with the roll and pitch sensor subsystem.

With reference to FIG. 13, all optical fibers comprising the set of which the particular optical fiber 56 is a member are positioned so as to terminate on a line parallel to the linear detector array 78. The optical fiber 56 in particular is positioned so that when the actual orientation of the second directional device 12 coincides with its nominal orientation (i.e., when the reflector device 36 is perpendicular to the optic axis of the aforementioned optical elements that produce the interfering beams 74 and 75), the interference pattern formed by the beams 74 and 75 is imaged on a central portion of the detector array 78. The other optical fibers of the set are positioned so that an interference pattern formed by some other pair of interfering beams derived from one of the other optical fibers of the set would be imaged on the detector array 78 for any tilt of the reflector device 36 that might occur as a result of an actual distortion within a range of possible distortions that could reasonably be expected to occur in the supporting structure 10.

As illustrated in FIG. 13, the optical fiber 56 is positioned to provide a point source of optical radiation at a focal point of the collimating lens 71 on the optic axis thereof. The collimating lens 71 is configured (ordinarily with spherical surfaces) to produce a collimated or slightly converging beam, which is propagated with a substantially planar wavefront perpendicular to the optic axis. The cylindrical lenses 72 and 53 spread the beam produced by the collimating lens 71 into a thin fan-like beam, which is "patterned" by the Young's double-slit device 73 into the pair of interfering beams 74 and 75 that are projected toward the reflector device 36. A comparison of FIG. 13 with FIG. 4 shows that the beams 74 and 75 are oriented generally orthogonally with respect to the beams 63 and 64. The reflector device 36 is positioned to reflect portions of the fan-like beams 74 and 75 as the corresponding beams 76 and 77, which are directed toward the detector array 78.

The image formed on the detector array 78 appears as an interference pattern in the preferred embodiment of the invention as illustrated in FIG. 13. However, in a simplified embodiment in which an unpatterned beam is reflected to the detector array 78, the image formed on the detector array 78 would be a spot of light. In FIG. 14, a centroid position of the image formed on the detector array 78 is illustrated schematically for a condition of zero distortion of the supporting structure 10, and for five different kinds of distortion occurring in the supporting structure 10 that affect the orientation of the second directional device 12 relative to the first directional device 11. From the centroid position of the image formed on the detector array 78, precise measurements can be made of changes in orientation of the second directional device 12 relative to the first directional device 11 due to angular distortions occurring in the supporting structure 10.

The first illustration in FIG. 5, which is labelled "NOMINAL", shows the centroid position of the image formed on the detector array 78 when the supporting structure 10 is in a condition of zero angular distortion. Thus, for the condition of zero angular distortion, the centroid position of the image is located on a central photodetector element of the linear array of photodetectors (e.g., CCDs) comprising the detector array 78.

A second illustration, which is labelled "PITCH", represents a condition in which, owing to a distortion in the supporting structure 10, the second directional device 12 undergoes only pitch relative to the first directional device 11. A third illustration, which is labelled "ROLL", represents a condition in which, owing to a distortion in the supporting structure 10, the second directional device 12 undergoes only roll relative to the first directional device 11. The centroid position of the image in the illustrations labelled "PITCH" and "ROLL" in FIG. 14 is seen to be unchanged from the centroid position of the image in the illustration labelled "NOMINAL", which indicates that the yaw sensor subsystem is insensitive to pitch and roll of the second directional device 12 relative to the first directional device 11. Thus, pitch and roll cannot be detected or measured by the detector array 78 of the yaw sensor subsystem 25.

A fourth illustration in FIG. 14, which is labelled "YAW", represents a condition in which, owing to a distortion in the supporting structure 10, the second directional device 12 undergoes yaw relative to the first directional device 11. Because of such yaw, the centroid position of the image is located on a photodetector element (or on a set of contiguous photodetector elements) that is displaced from the central photodetector element of the detector array 78. The extent of separation of the centroid position of the image from the central photodetector element on the detector array 78 provides a measurement of the amount of yaw that the second directional device 12 has undergone relative to the first directional device 11.

A fifth illustration and a sixth illustration in FIG. 14, which are labelled "VERTICAL" and "LATERAL", respectively, represent conditions in which distortions (if any) occurring in the supporting structure 10 result in a net zero angular distortion, but cause a translational displacement of the reflector device 36 in a direction orthogonal to the roll axis. The centroid position of the image formed on the detector array 78 is seen to be unaffected by distortions in the supporting structure 10 that result in no net angular distortion, even if a concomitant "vertical" and/or "lateral" displacement of the reflector device 36 occurs. It is apparent from a comparison of the fifth (i.e., "VERTICAL") and sixth (i.e., "LATERAL") illustrations with the first (i.e., "NOMINAL") illustration in FIG. 14 that the yaw sensor subsystem is insensitive to any translational displacement orthogonal to the roll axis.

As discussed above in connection with the roll and pitch sensor subsystem shown in FIG. 4, a relatively small radial "in/out" displacement of the second directional device 12 relative to the first directional device 11 might have a "cross-coupling" effect that would merely affect the overall scale factor. A larger radial displacement, on the other hand, might defocus the image formed on the detector array 78. However, for presently contemplated applications of the present invention, the only way in which any significant radial displacements might be caused would be by thermal expansion of the supporting structure 10, which would produce tolerably small displacements resulting in negligibly small measurement errors. The effect of radial displacement of the supporting structure 10 is not illustrated in FIG. 14.

As indicated in FIG. 13, the detector array 78 is relatively short in length—just like the detector arrays 69 and 70. To accommodate relatively large amounts of yaw, without requiring the detector array 78 to be inconveniently long to prevent the image from being formed "off-scale", a set of optical fibers (of which the optical fiber 56 is but one member) is positioned so that, for any given amount of yaw within a range of yaw that the reflector device 36 could be expected to undergo, at least one of the optical fibers of the set (if not the optical fiber 56) is appropriately positioned so that optical radiation supplied thereby is collimated by the lens 71 along a path through the cylindrical lenses 72 and 54 and the intervening Young's double-slit device 73 so that the resulting beams 74 and 75, when reflected from the reflector device 36, are focussed on the detector array 78. As shown in FIG. 10, all the optical fibers that form the set of which the particular optical fiber 56 is a member terminate on a line perpendicular to the optic axis of those optical components (viz., the collimating lens 71, the cylindrical lens 72, the double-slit diffraction grating 73, and the cylindrical lens 53) that produce the beams 74 and 75.

Alternatively, instead of using a set of optical fibers for ensuring that the centroid position of the interference pattern formed by the converging beams 76 and 77 reflected from the reflector device 36 is formed on a central portion of the detector array 78, a Risley prism could be used in conjunction with a single point source of light (e.g., a single optical fiber). The power selected for the Risley prism would be such that the interfering beams 74 and 75 incident upon the reflector device 36 would be deviated through a sufficient angle to ensure that the corresponding beams 76 and 77 reflected from the reflector device 36 would be directed to the central portion of the detector array 78. An angle encoder could be used in conjunction with the Risley prism to provide a measurement of the beam deflection, which could be combined with positional information for the interference pattern formed on the detector array 78 to obtain a measurement of the orientation of the second directional device 12 relative to the first directional device 11.

Some applications are foreseen in which multiple optical fibers and a Risley prism are used together. The Risley prism would be used to compensate for "onetime" distortion effects (e.g., gravity-release and cooldown), and the multiple optical fibers would be used to accommodate a reduced dynamic range of distortions (e.g., thermal distortions) associated with continuous operation. In such applications in which a Risley prism is used, an angle encoder is not ordinarily required. The Risley prism is first adjusted to compensate for initial distortions, and then the optical coordinate alignment system is aligned by boresighting on a common object.

The accuracy of pitch, roll and yaw measurements made by an optical coordinate transfer assembly according to the present invention is limited by error sources inherent in the assembly that contribute to uncertainty in the measurements. Error sources include: (1) inaccuracies in adjusting the power of the Risley prism (or prisms)—if a Risley prism (or prisms) are used; (2) inaccuracies in the relative positions of the ends of the various optical fibers when switching between alternative point sources of optical radiation as the second directional device 12 undergoes pitch, roll and/or yaw relative to the first directional device 11; (3) inaccuracies in resolving the positions of the centroids of the interference-pattern images on the detector arrays 69, 70 and 78; and (4) imperfections in the various optical components (mirrors and lenses).

With regard to the problem of resolving the positions of the centroids of interference-pattern images on the detector arrays 69, 70 and 78, a number of factors contribute to measurement uncertainties. Electronic noise contributes random errors (which are generally rapidly varying), whose effects can be minimized by averaging multiple measurement readings. Irregularities of a mechanical nature (e.g., mirror-surface defects, or non-uniform spacing of photodetector elements) cause systematic errors that can be mapped so that compensating adjustments can be made to the measurements. The formation of broad images (obtained from beams that pass through relatively large portions of the various optical components), which appear as interference patterns on the detector arrays 69, 70 and 78, reduces systematic errors by generating data over large portions of the detector arrays 69, 70 and 71, thereby averaging out localized systematic errors. Environmental factors (e.g., thermal distortions) can cause errors (called "drift" errors) that vary slowly over time. Drift errors in combination with random errors and systematic errors set the limit on measurement accuracy.

In general, random errors can be reduced by increasing the amount of data processed in making the measurements. If a simple aperture were to be used instead of the Young's double-slit device 62 illustrated in FIG. 4, only a single beam (instead of the two beams 63 and 64) would be propagated toward the reflector device 35. Consequently, only a single reflected beam (instead of the two reflected beams 65 and 67) would be focussed onto the detector array 69, and only a single reflected beam (instead of the two reflected beams 66 and 68) would be focussed onto the detector array 70, to form a single spot on the photodetector elements of the detector array 69 and a single spot on the photodetector elements of the detector array 70. Centroiding of the positions of such single-spot images would provide measurements of pitch and roll. However, to minimize errors due to random noise, use of the Young's double-slit device 62 as illustrated in FIG. 4 is preferred over a simple aperture. The Young's double-slit device 62 provides "multiple spots" (i.e., a diffraction-pattern image) on which to perform a centroiding procedure.

FIG. 15 is a graphical representation of a typical output of any one of the detector arrays 69, 70, and 78 when the interference pattern produced by a Young's double-slit device is imaged on the central portion of the detector array. The output of each individual photodetector element of the array is plotted, as in a bar graph, with a longer bar indicating a stronger response. Each "fringe" of the interference pattern illuminates several adjacent photodetector elements, so that some photodetector elements have a stronger response than others located a few spaces away. Thus, the intensity of the fringes varies across the interference pattern in the manner of a classic "Young's double-slit fringe pattern-"—i.e., the peaks of all the fringes lie under a pattern envelope, as illustrated in FIG. 15, with the brightest fringe at the center of the pattern.

In the absence of any patterning device in an outgoing beam, the beam would be defined by the aperture of the most constricting optics. A beam passing through such an aperture could be focussed down to a small spot image on a detector array so as to illuminate one or more photodetector elements of the detector array, thereby in effect appearing like a single fringe of FIG. 12. If the spot were too small to illuminate more than one photodetector element of the detector array at the same time, it would not be possible to measure the position of the spot to a fraction of the length of an individual photodetector element, as might be required in many applications. If the diameter of the aperture were made smaller, the spot image formed on the detector array would become broader, thereby illuminating additional photodetector elements. Responses provided by these additional photodetector elements would provide a more accurate measurement (as a fraction of image width) of the image position on the detector array, since detector noise is reduced by the square root of the number of independent readings. However, since the spot image covers more photodetector elements, the position of the image in absolute terms cannot be as well determined. Thus, there would ordinarily be no advantage in using a small "pinhole" aperture or a single slit to produce the image.

If a beam of monochromatic light is used, a patterned image can be formed by interposing a pair of small-angled prisms in the beam so that each prism deflects half of the beam toward a centerline. Light deflected from the two halves of the beam interferes (as in a "shearing interferometer") to produce a set of many relatively narrow fringes of uniform intensity. The many fringes enable numerous photodetector element readings to be obtained, and the narrowness of the fringes permits accurate determination of the fringe positions. However, because of the uniform intensity of the fringes, it is difficult to distinguish one fringe from another, which is a source of ambiguity. In contrast, a Young's double-slit pattern, which also has many relatively narrow fringes, does not have fringes of uniform intensity. In a Young's double-slit pattern, the central fringe is "tagged" by its brighter intensity for easier identification.

Other image patterning schemes (e.g., multiple slits, holograms, etc.) are possible, and could be used in practicing the present invention to increase the accuracy of the image position determinations. In certain applications (e.g., where high precision is not required, particularly with respect to the yaw sensor subsystem), no patterning of the image (beyond the "default patterning" provided by the aperture) may be needed.

In operation, measurement data can be output from an optical coordinate transfer system according to the present invention as fast as the detector arrays 69, 70 and 78 can be read and their information processed. Short detector arrays (i.e., arrays comprising about 1000 photodetector elements) can be read at a rate of 20 MHz, thus requiring about 50 microseconds to read an entire array. Flash analog-digital converters (ADCs) are commercially available, which have a 20 MHz sampling rate and require 50 microseconds to digitize the full array. The data processing includes obtaining fast Fourier transforms (FFTs) of the image patterns, which can be obtained using commercially available high-speed processing chips with 500 microsecond turn-around times. The rest of the data processing involves simple multiplication and addition, which can be handled by a conventional microprocessor chip in under 100 microseconds, so that the total data processing time is approximately 700 microseconds. To the data processing time must be added:

1) the exposure time over which the illumination of each of the detector arrays 69, 70 and 78 is integrated, which is very design-specific and includes factors such as the power of the light sources and the dimensions of the patterning devices (which in turn are dependent upon accuracy requirements);
2) the required dynamic range over which the optical power is spread; and
3) constraints on the size of the rooftop-mirror/lens assembly 21, and on the separation between the optical alignment sensor 20 and the rooftop-mirror/lens assembly 21.

Depending upon the configuration of the optical coordinate transfer assembly, throughput rates in excess of 500 Hz are possible using commercially available optical and electronic components.

The roll, pitch and yaw measurements made by an optical coordinate transfer assembly according to the present invention are obtained as positions of images formed on linear arrays of discrete photodetector elements. These arrays of discrete photodetector elements give "quantized" data that do not drift in position. The responses of the individual photodetector elements may drift, but the data processing algorithm uses data from all the photodetector elements collectively in a manner that is insensitive to overall or individual gain variations in the photodetector elements. The principal anticipated source of drift error in an optical coordinate transfer assembly according to the present invention would be attributable to inexactness in the fabrication of the optical alignment sensor 20. With reference to FIG. 4, any imprecision in positioning the output ends of the optical fibers (i.e., the light sources) 55 and 56 relative to the collimating lenses 60 and 71 and the Young's double-slit devices 62 and 73 would introduce drift errors. Additional drift errors could be introduced by thermal gradients in the various optical components. Careful engineering of the assembly to specify optimally suitable materials, and to provide for thermal shielding and heat dissipation, can reduce drift to an acceptable limit.

Alternative embodiments of an optical coordinate transfer assembly according to the present invention could be implemented for particular applications. Thus, with regard to the reflector devices 35 and 36, a set of five different embodiments is illustrated in FIG. 16. Each of the embodiments shown in FIG. 16 could be configured to function as a regular (i.e., orthogonal) rooftop mirror for use as the reflector device 36, or as a "spoiled" (i.e., non-orthogonal) rooftop mirror for use as the reflector device 35.

In FIG. 16, in an embodiment labelled (a), the cylindrical lens extends transversely with respect to the two reflective surfaces of the rooftop mirror. In an embodiment labelled (b), the cylindrical lens extends longitudinally between the two reflective surfaces of the rooftop mirror, and has an edge that is adjacent to or in contact with the ridge line (i.e., the intersection of the two reflective surfaces) of the rooftop mirror. In an embodiment labelled (c), there is no cylindrical lens, and one or both of the two reflective surfaces of the rooftop mirror are cylindrical surfaces. In an embodiment labelled (d), the cylindrical lens of the embodiment labelled (a) is replaced by a holographic optical element (HOE) or functionally equivalent optical device that, like the cylindrical lens of embodiment (a), focuses light only in a single plane. Alternatively, the HOE or equivalent optical device of embodiment (d) could be substituted for the cylindrical lens of embodiment (b), or could be fashioned as an integral portion of one or both of the reflective surfaces in embodiment (c). Thus, engraved flat reflective gratings could be used in place of the curved smooth relfective surfaces shown for embodiment (c). In an embodiment labelled (e), the reflector device is a solid prism (e.g., a piece of glass or quartz) configured so that light passes through a front face thereof, is internally reflected from two back faces thereof, and then passes again through the front face. The focussing required of embodiment (e) can be achieved either by providing a curved front face (like a cylindrical lens fused to the front of an ordinary rooftop prism), or by curving one or both of the back faces in a manner analogous to the curved (i.e., cylindrical) reflective surface(s) of embodiment (c). Alternatively, a HOE or functionally equivalent optical device could be fashioned as an integral portion of one or more of the faces of a solid prism as illustrated for embodiment (e).

In FIG. 17, a simplified embodiment of a yaw sensor according to the present invention is illustrated in which an intercepted portion of an unpatterned beam 74' is reflected by the reflector device 36 as a single beam 76'. The beam 76' is focussed so that the image formed on the detector array 78 appears as spot of light (rather than as an interference pattern). The yaw sensor of FIG. 17 differs from the yaw sensor of FIG. 13 in that the patterning device (i.e., the Young's double-slit device 73) used in the embodiment of FIG. 13 is replaced in the embodiment of FIG. 17 by a simple aperture 73'.

Each of the various embodiments of the reflector devices 35 and 36 of the present invention (whatever its particular configuration might be) is configured:

a) to provide two reflective surfaces that intersect in substantially a straight line for reflecting a beam of electromagnetic radiation (whether patterned or unpatterned) incident thereon to a detector, and b) to focus the reflected beam (whether patterned or unpatterned) in a plane that is substantially normal to the line of intersection of the two reflective surfaces.

The present invention has been described above in terms of particular embodiments presently contemplated for specific applications. However, a practitioner skilled in the art of coordinate transfer techniques, upon perusal of the foregoing description and accompanying drawing, would be able to devise alternative embodiments more particularly suited for other applications, but which would nevertheless be within the scope of the present invention. Therefore, the embodiments disclosed herein are to be considered merely as illustrative of the invention, which is defined more generally by the following claims and their equivalents.

We claim:

1. An apparatus for measuring an orientation of a first object relative to an orientation of a second object, said apparatus comprising:

a) means for generating a fan-like beam of electromagnetic radiation, said fan-like beam having a direction of propagation determined by the orientation of said first object, said fan-like beam diverging in only a single dimension while otherwise converging, said dimension in which said fan-like beam diverges being perpendicular to said direction of propagation;

b) a reflector device comprising exactly two reflective surfaces, said reflector device having an orientation that is determined by the orientation of said second object, said reflector device being positioned so as to intercept a portion of said fan-like beam, said reflector device being configured to:

(i) reflect said intercepted portion of said fan-like beam from said two reflective surfaces, and (ii) focus said intercepted portion of said fan-like beam reflected from said two reflective surfaces in said single dimension in which said fan-like beam previously diverges, said fan-like beam otherwise continuing to converge, so as to form a spot on a focal line; and c) detector means responsive to said electromagnetic radiation, said detector means being positioned to intercept said portion of said fan-like beam that is reflected and focussed onto said spot on said focal line by said reflector device so as to produce a signal indicative of position of said electromagnetic radiation on said detector, the position of said electromagnetic radiation on said detector being a measure of the orientation of said first object relative to the orientation of said second object.

2. The apparatus of claim 1 wherein said means for generating said fan-like beam of electromagnetic radiation comprises:

a) a source of optical radiation; and b) means for causing optical radiation provided by said source to be configured as said beam.

3. The apparatus of claim 2 wherein said source of optical radiation comprises means for producing substantially monochromatic optical radiation.

4. The apparatus of claim 3 wherein said means for producing substantially monochromatic optical radiation comprises laser means.

5. The apparatus of claim 4 further comprising an optical fiber coupled to said laser means, said optical fiber having an output end positioned substantially at a focal point of said means for causing optical radiation provided by said source to be configured as said beam.

6. The apparatus of claim 5 further comprising a plurality of laser means and a corresponding plurality of optical fibers; each one of said optical fibers being coupled to a corresponding one of said laser means; output ends of said optical fibers being positioned with respect to said focal point, and with respect to an optic axis of said means for causing optical radiation provided by said source to be configured as said beam, so that an appropriate one of said laser means can be selected to provide optical radiation for said beam in order for the direction of said beam to be off-axis with respect to said optic axis.

7. The apparatus of claim 2 wherein said source of optical radiation comprises a light-emitting diode.

8. The apparatus of claim 2 wherein said means for causing optical radiation provided by said source to be configured as said beam comprises a lens system.

9. The apparatus of claim 8 wherein said means for causing optical radiation provided by said source to be configured as said beam further comprises means for patterning said beam so as to be spatially non-uniform.

10. The apparatus of claim 9 wherein said patterning means comprises a device for producing periodic spatial variations in intensity of said beam.

11. The apparatus of claim 10 wherein said device for producing periodic spatial variations in intensity of said beam comprises a Young's double-slit device.

12. The apparatus of claim 1 wherein said detector means responsive to said electromagnetic radiation comprises a linear detector means, 13. The apparatus of claim 12 wherein said linear detector means comprises a linear array of photodetector elements.

14. The apparatus of claim 13 wherein said photodetector elements comprise charge-coupled devices.

15. The apparatus of claim 12 wherein said reflector device comprises a means for:
   a) supporting said two reflective surfaces on corresponding interior faces of an angle of intersection, said interior faces having a line of intersection that extends substantially parallel to said linear detector means, said two reflective surfaces being supported so as to be generally orthogonal to each other; and
   b) focussing said intercepted portion of said fan-like beam reflected from said two reflective surfaces in a specified direction onto said spot on said focal line, said focal line being substantially parallel to said line of intersection of said interior faces.

16. The apparatus of claim 15 wherein said reflector device causes said intercepted portion of said fan-like beam to be refractively focussed in said specified direction onto said spot on said focal line.

17. The apparatus of claim 15 wherein said reflector device causes said intercepted portion of said fan-like beam to be reflectively focussed in said specified direction onto said spot on said focal line.

18. The apparatus of claim 15 wherein said reflector device causes said intercepted portion of said fan-like beam to be diffractively focussed in said specified direction onto said spot on said focal line.

19. The apparatus of claim 18 wherein said reflector device causes said intercepted portion of said fan-like beam to be diffractively focussed holographically onto said spot on said focal line.

20. The apparatus of claim 15 wherein said two reflective surfaces are supported on corresponding surface portions of a solid element made of a material that is substantially transparent to said beam, said solid element being configured to focus said intercepted portion of said fan-like beam reflected from said two reflective surfaces onto said spot on said focal line.

21. The apparatus of claim 20 wherein said solid element is configured so that said two reflective surfaces are substantially planar surfaces, and so that said intercepted portion of said fan-like beam reflected from said two reflective surfaces exits from said solid element through a curved surface portion of said solid element.

22. The apparatus of claim 21 wherein said curved surface portion of said solid element is generally cylindrical.

23. The apparatus of claim 20 wherein said solid element is configured so that at least one of said reflective surfaces is curved so as to focus said intercepted portion of said fan-like beam onto said spot on said focal line.

24. The apparatus of claim 20 wherein said solid element is configured so that a face of said solid element is a diffractive surface.

25. The apparatus of claim 24 wherein said diffractive surface is holographic.

26. The apparatus of claim 15 wherein said means for supporting said two reflective surfaces, and for focussing said intercepted portion of said fan-like beam reflected from said two reflective surfaces onto said spot on said focal line, comprises:
   a) a structure for supporting said two reflective surfaces on said corresponding interior faces of said angle of intersection; and
   b) a focussing element disposed between said two reflective surfaces.

27. The apparatus of claim 26 wherein said focussing element substantially subtends said angle of intersection.

28. The apparatus of claim 27 wherein said focussing element refractively focuses said intercepted portion of said fan-like beam onto said spot on said focal line.

29. The apparatus of claim 28 wherein said refractive focussing element is a single lens element.

30. The apparatus of claim 27 wherein said focussing element diffractively focuses said intercepted portion of said fan-like beam onto said spot on said focal line.

31. The apparatus of claim 30 wherein said diffractive focussing element is holographic.

32. The apparatus of claim 26 wherein said focussing element substantially bisects said angle of intersection.

33. The apparatus of claim 32 wherein said focussing element refractively focuses said intercepted portion of said fan-like beam onto said spot on said focal line.

34. The apparatus of claim 33 wherein said refractive focussing element is a single lens element.

35. The apparatus of claim 32 wherein said focussing element diffractively focuses said intercepted portion of said fan-like beam onto said spot on said focal line.

36. The apparatus of claim 35 wherein said diffractive focussing element is holographic.

37. The apparatus of claim 15 wherein at least one of said reflective surfaces of said reflector device is curved.

38. The apparatus of claim 15 wherein at least one of said reflective surfaces functions as a diffractive focussing surface.

39. The apparatus of claim 1 further comprising signal processing means for determining a centroid position of said spot on said focal line, and for measuring changes in the centroid position of said spot on said focal line, said changes in the centroid position of said spot indicating changes in angular orientation in one degree of freedom of said first object relative to the orientation of said second object.

40. The apparatus of claim 39 wherein said signal processing means comprises electronic means for obtaining fast Fourier transforms of image patterns formed by said beam on said detector means.

41. The apparatus of claim 1 further comprising a pair of detector means responsive to said electromagnetic radiation, each of said detector means having a corresponding orientation that is determined by the orientation of said first object, said two reflective surfaces of said reflector device being sufficiently non-orthogonal with respect to each other so as to cause said intercepted portion of said fan-like beam to be reflected from said two reflective surfaces in two different directions toward corresponding ones of said pair of detector means, said reflector device focussing said intercepted portion of said fan-like beam reflected in said two different directions onto spots on two corresponding focal lines.

42. The apparatus of claim 41 further comprising signal processing means for determining centroid positions of said spots focussed onto said two corresponding focal lines, and for measuring changes in the centroid positions of said spots on said focal lines, said changes in the centroid positions of said spots indicating changes in angular orientation in two degrees of freedom of said first object relative to the orientation of said second object.

43. The apparatus of claim 42 wherein said reflector device causes said intercepted portion of said fan-like beam to be refractively focussed in said two different directions onto said spots on said two corresponding focal lines.

44. The apparatus of claim 42 wherein said reflector device causes said intercepted portion of said fan-like beam to be reflectively focussed in said two different directions onto said spots on said two corresponding focal lines.

45. The apparatus of claim 42 wherein said reflector device causes said intercepted portion of said fan-like beam to be diffractively focussed in said two different directions onto said spots on said two corresponding focal lines.

46. The apparatus of claim 45 wherein said reflector device causes said intercepted portion of said fan-like beam to be diffractively focussed holographically onto said spots on said two corresponding focal lines.

47. The apparatus of claim 42 wherein said two reflective surfaces are supported on corresponding surface portions of a solid element made of a material that is substantially transparent to said beam, said solid element being configured to focus said intercepted portion of said fan-like beam reflected from said two reflective surfaces onto said spots on said two corresponding focal lines.

48. The apparatus of claim 47 wherein said solid element is configured so that said two reflective surfaces are substantially planar surfaces, and so that said intercepted portion of said fan-like beam reflected from said two reflective surfaces exits from said solid element through a curved surface portion of said solid element.

49. The apparatus of claim 48 wherein said curved surface portion of said solid element is generally cylindrical.

50. The apparatus of claim 47 wherein said solid element is configured so that at least one of said reflective surfaces is curved so as to focus said intercepted portion of said fan-like beam onto said spots on said two corresponding focal lines.

51. The apparatus of claim 47 wherein said solid element is configured so that a face of said solid element is a diffractive surface.

52. The apparatus of claim 51 wherein said diffractive surface is holographic.

53. The apparatus of claim 42 wherein said means for supporting said two reflective surfaces, and for focussing said intercepted portion of said fan-like beam reflected from said two reflective surfaces onto said spots on said two corresponding focal lines, comprises:
    a) a structure for supporting said two reflective surfaces on said corresponding interior faces of said angle of intersection; and
    b) a focussing element disposed between said two reflective surfaces.

54. The apparatus of claim 53 wherein said focussing element substantially subtends said angle of intersection.

55. The apparatus of claim 54 wherein said focussing element refractively focuses said intercepted portion of said fan-like beam onto said spots on said two corresponding focal lines.

56. The apparatus of claim 55 wherein said refractive focussing element is a single lens element.

57. The apparatus of claim 54 wherein said focussing element diffractively focuses said intercepted portion of said fan-like beam onto said spots on said two corresponding focal lines.

58. The apparatus of claim 57 wherein said diffractive focussing element is holographic.

59. The apparatus of claim 53 wherein said focussing element substantially bisects said angle of intersection.

60. The apparatus of claim 59 wherein said focussing element refractively focuses said intercepted portion of said fan-like beam onto said spots on said two corresponding focal lines.

61. The apparatus of claim 60 wherein said refractive focussing element is a single lens element.

62. The apparatus of claim 59 wherein said focussing element diffractively focuses said intercepted portion of said fan-like beam onto said spots on said two corresponding focal lines.

63. The apparatus of claim 62 wherein said diffractive focussing elements is holographic.

64. The apparatus of claim 42 wherein at least one of said reflective surfaces of said reflector device is curved.

65. The apparatus of claim 42 wherein at least one of said reflective surfaces functions as a diffractive focussing surface.

66. A reflector device for reflecting a portion of a fan-like beam of electromagnetic radiation exactly twice, said fan-like beam initially diverging in only a single dimension while otherwise converging, and for focussing said reflected portion of said fan-like beam in a specified direction in said single dimension in which said fan-like beam initially diverges, said fan-like beam otherwise continuing to converge, so as to form a spot on a focal line; said reflector device comprising a pair of reflective surfaces disposed on corresponding interior faces of an angle of intersection, said interior faces intersecting each other in a line of intersection that extend substantially parallel to said focal line.

67. The reflector device of claim 66 wherein said reflective surfaces are supported on corresponding surface portions of a solid element made of a material that is substantially transparent to said beam, said solid element being configured so that said portion of said fan-like beam reflected from said reflective surfaces is focused onto said spot on said focal line.

68. The reflector device of claim 67 wherein said solid element is configured so that said portion of said fan-like beam is refractively focussed onto said spot on said focal line.

69. The reflector device of claim 68 wherein said solid element is configured so that said reflective surfaces are substantially planar surfaces, and so that said portion of said fan-like beam exits from said solid element in said specified direction through a curved surface portion of said solid element.

70. The reflector device of claim 67 wherein said solid element is configured so that said portion of said fan-like beam is reflectively focussed onto said spot on said focal line.

71. The reflector device of claim 70 wherein said soild element is configured so that at least one of said reflective surfaces is curved.

72. The reflector device of claim 67 wherein said solid element is configured so that said portion of said fan-like beam is diffractively focussed onto said spot on said focal line.

73. The reflector device of claim 72 wherein a surface portion of said solid element is holographically configured.

74. The reflector device of claim 66 wherein at least one of said reflective surfaces is curved.

75. The reflector device of claim 66 wherein at least one of said reflective surfaces functions as a diffractive focussing surface.

76. An apparatus for focussing a portion of a fan-like beam of electromagnetic radiation in a specified direction so as to form a spot on a focal line, said fan-like beam initially diverging in only a single dimension while otherwise converging, said apparatus comprising:
  a) a pair of relfective surfaces positionable so that at least one of said reflective surfaces intercepts said portion of said fan-like beam, said reflective surfaces being supported on corresponding interior faces of an angle of intersection; and
  b) a focussing element disposed between said two reflective surfaces, said focussing element being configured and positioned to cause said intercepted portion of said fan-like beam relfected by said two reflective surfaces to be focussed in said single dimension in which said fan-like beam initially diverges, said fan-like beam otherwise continuing to converge, so as to form said spot on said focal line.

77. The apparatus of claim 76 wherein said focussing element comprises a lens.

78. The apparatus of claim 77 wherein said lens has at least one surface that is generally cylindrical with respect to a line of intersection of said interior faces upon which said reflective surfaces are supplied.

79. The apparatus of claim 76 wherein said focussing element substantially subtends said angle of intersection of said interior faces upon which said reflective surfaces are supported.

80. The apparatus of claim 76 wherein said focussing element substantially bisects said angle of intersection of said interior faces upon which said reflective surfaces are supported.

81. The apparatus of claim 76 wherein said angle of intersection of said interior faces upon which said reflective surfaces are supported is substantially a right angle, so that said beam is doubly reflected by said reflective surfaces and is focussed in said specified direction onto said focal line.

82. The apparatus of claim 76 wherein said reflective surfaces are sufficiently non-orthogonal with respect to each other, so that said beam is doubly reflected by said reflective surfaces and is focussed in two specified directions onto two corresponding focal lines.

83. A reflector device for causing a portion of a fan-like beam of electromagnetic radiation to be focussed in two specified directions along two separate paths so as to form two spots on two corresponding focal lines, said fan-like beam initially diverging in only a single dimension while otherwise converging, said reflector device causing said fan-like beam to be focussed along each of said paths in said single dimension in which said fan-like beam initially diverges, said fan-like beam otherwise continuing to converge along each of said paths, said reflector device comprising a pair of reflective surfaces positionable so that at least one of said reflective surfaces intercepts said portions of said fan-like beam, said reflective surfaces being disposed non-orthogonally with respect to each other on corresponding interior faces of an angle of intersection. said interior faces of said angle of intersection intersecting each other in a line of intersection that extends substantially parallel to each of said focal lines.

84. The relfector device of claim 83 wherein said reflective surfaces are supported on corresponding surface portions of a solid element made of a material that is substantially transparent to said beam, said solid element being configured so that said beam reflected from said reflective surfaces is focussed onto each of said focal lines.

85. The reflector device of claim 84 wherein said solid element is configured so that said beam is refractively focussed onto each of said focal lines.

86. The reflector device of claim 85 wherein said solid element is configured so that said reflective surfaces are substantially planar surfaces, and so that said beam exits from said solid element in said two specified directions through a curved surface portion of said soild element.

87. The reflector device of claim 84 wherein said solid element is configured so that said beam is reflectively focussed onto each of said focal lines.

88. The reflector device of claim 84 wherein said sloid element is configures so that at least one of said reflective surfaces is curved.

89. The reflector device of claim 84 wherein said solid element is configured so that said beam is diffractively focussed onto each of said focal lines.

90. The reflector device of claim 89 wherein a surface portion of said solid element is holographically configured.

91. The reflector device of claim 83 wherein at least one of said reflective surfaces is curved.

92. The reflector device of claim 83 wherein at least one of said reflective surfaces functions as a diffractive focussing surface.

93. An apparatus for focussing a portion of a fan-like beam of electromagnetic radiation in two specified directions along two separate paths so as to form two spots on two corresponding focal lines, said fan-like beam initially diverging in only a single dimension while otherwise converging, said apparatus comprising:
  a) a pair of reflective surfaces positionable so that at least one of said relfective surfaces intercepts said portion of said fan-like beam, said reflective surfaces being supported on corresponding interior faces of an angle of intersection, said interior faces being non-orthogonal to each other; and
  b) a focussing element disposed between said two reflective surfaces, said focussing element being configured and positioned to cause said fan-like beam to be focussed along each of said paths in said single dimension in which said fan-like beam initially diverges, said fan-like beam otherwise continuing to converge along each of said paths, so as to form said spots on said corresponding focal lines.

94. The apparatus of claim 93 wherein said focussing element comprises a lens.

95. The apparatus of claim 94 wherein said lens has at least one surface that is generally cylindrical with respect to a line of intersection of said interior faces upon which said reflective surfaces are supported.

96. The apparatus of claim 93 wherein said focussing element substantially subtends said angle of intersection of said interior faces upon which said reflective surfaces are supported.

97. The apparatus of claim 93 wherein said focussing element substantially bisects said angle of intersection of said interior faces upon which said reflective surfaces are supported.

98. A spoiled rooftop mirror and lens assembly for causing a beam of electromagnetic radiation to be focussed in two specified directions so as to form a corresponding spot on each of two focal lines, said beam initially diverging in only a single dimension while otherwise converging, said assembly comprising:
(a) a pair of substantially planar reflective elements disposed non-orthogonally with respect to each other; and
(b) a focussing element fixedly mounted within an angle of intersection between said relfective elements, said focussing elements being configured and disposed with respect to said relfective element so as to focus said beam reflected from said reflective elements in said single dimension in which said beam initially diverges, said beam otherwise continuing to converge, so as to form said spots on said two focal lines.

99. The spoiled rooftop mirror lens assembly of claim 98 wherein said focussing element is refractive.

100. The spoiled rooftop mirror and lens assembly of claim 98 wherein said focussing element has at least one surface that is cylindrical with respect to an axis that extends substantially parallel to a line of intersection of said reflective elements.

101. The spoiled rooftop mirror and lens assembly of claim 100 weherein said focussing element is mounted so as to subtend said angle of intersection.

102. The spoiled rooftop mirror and lens assembly of claim 100 wherein said focussing element is mounted with respect to said reflective elements so that an edge portion of said focussing element substantially coincides with said line of intersection of said reflective elements.

103. The spoiled rooftop mirror and lens assembly of claim 102 wherein said focussing element is mounted so as to bisect said angle of intersection.

104. A system for measuring relative angular orientation of a second object with respect to a first object in one degree of freedom about an axis orthogonal to a line connecting said first and second objects, said system comprising:
a) means for generating a fan-like beam of electromagnetic radiation, said beam-generating means being mounted on said first object so that said fan-like beam has a direction of propagation determined by the orientation of said first object, said fan-like beam diverging in only a single dimension while otherwise converging, said dimension in which said fan-like beam diverges being perpendicular to said direction of porpagation;
b) a reflector device mounted on said second object so as to intercept a portion of said fan-like beam, said reflector device comprising exactly two reflective surfaces, said two reflective surfaces being disposed orthogonally with respect to each other so as to produce a double reflection of said intercepted portion of said fan-like beam and to cause said doubly reflected intercepted portion of said fan-like beam to be focussed in said single dimension in which said fan-like beam previously diverges, said fan-like beam otherwise continuing to converge, in a specified direction so as to form a spot on a focal line;
c) detector means responsive to said electromagnetic radiation, said detector means being mounted on said first object so that said focal line is formed on said detector means, said detector means producing a signal corresponding to the position of said spot on said focal line, said signal being indicative of instantaneous angular orientation in said one degree of freedom of said second object relative to said first object; and
d) signal processing means responsive to said signal indicative of the instantaneous angular orientation in said one degree of freedom of said second object relative to said first object so as to provide a measure of said relative angular orientation in said one degree of freedom of said second object with respect to said first object.

105. A system for measuring relative angular orientation in two degrees of freedom of a second object with respect to a first object, one of said degrees of freedom being a rotation about a line connecting said first and second objects, said system comprising:
a) means for generating a fan-like beam of electromagnetic radiation, said beam-generating means being mounted on said first object so that said fan-like beam has a direction of propagation determined by the orientation of said first object, fan-like beam diverging in only a single dimension while otherwise converging, said dimension in which said fan-like beam diverges being perpendicular to said direction of propagation;
b) a reflector device mounted on said second object so as to intercept a portion of said fan-like beam, said reflector device comprising exactly two reflective surfaces, said two reflective ssurfaces being disposed sufficiently non-orthogonally with respect to each other so as to produce a double reflection of said intercepted portion of said fan-like beam and to cause said doubly reflected intercepted portion of said fan-like beam to be focussed in said single dimension in which said fan-like beam previously diverges, said fan-like beam otherwise continuing to converge, in two specified directions so as to form a corresponding spot on each of two focal lines;
c) detector means responsive to said electromagnetic radiation, said detector means being mounted on said first object so that said two focal lines are formed on said detector means, said detector means producing two signals corresponding to the positions of said spots on said focal lines, said two signals being indicative of instantaneous angular orientation in said two degrees of freedom of said second object relative to said first object; and
d) signal processing means responsive to said two signals indicative of the instantaneous angular orientation in said two degrees of freedom of aid second object relative to said first object so as to provide a measure of said relative angular orientation in said two degrees of freedom of said second object with respect to said first object.

106. A system for measuring relative angular orientation in three degrees of freedom of a second object relative to a first object, one of said degrees of freedom being a rotation about a line connecting said first and second objects, said system comprising:
a) means for generating a first fan-like beam of electromagnetic radiation that diverges in a first plane, said first fan-like beam otherwise converging, said first beam generating means being mounted on said first object so that said first fan-like beam has a direction determined by the orientation of said first object;

b) a first reflector device mounted on said second object so as to intercept a portion of said first fan-like beam, said first reflector device being configure to produce a double reflection of said intercepted portion of said first fan-like beam and to cause said reflected portion of said first fan-like beam to bre focussed in said first plane in which said first fan-like beam previously diverges, said first fan-like beam otherwise continuing to converge, in two specified directions so as to form first and second spots on corresponding first and second focal lines, said first and second focal lines being substantially parallel to each other;

c) first detector means responsive to said electromagnetic radiation, said first detector means being mounted on said first object so that said first and second focal lines are formed on said first detector means, said first detector means producing a first signal and a second signal corresponding to the positions of said first and second spots on said focal lines, said first and second signals being indicative of instantaneous angular orientation in two corresponding degrees of freedom of said second object relative to said first object;

d) means for generating a second fan-like beam of electromagnetic radiation that diverges in a second plane, said second fan-like beam otherwise converging, said second plane being substantially orthogonal to said first plane, said second beam generating menas being mounted on said first object so that said second fan-like beam has a direction determined by the orientation of said first object;

e) a second reflector device mounted on said second object so as to intercept a portion of said second fan-like beam, said second reflector device being configured to produce a double reflection of said intercepted portion of said second fan-like beam and to cause said reflected portion of said second fan-like beam to be focussed in said second plane in which said second fan-like beam previously diverges, said second fan-like beam otherwise continuing to converge, in a specified direction so as to form a third spot on a corresponding third focal line, said third focal line being substantially orthogonal to said first and second focal lines;

f) second detector means responsive to said electromagnetic radiation, said second detector means being mounted on said first object so that said third focal line is formed on aid second detector means, said second detector means producing a third signal corresponding to the position of said third spot on said third focal line, said third signal being indicative of instantaneous angular orientation in a corresponding third degree of freedom of said second object relative to said first object; and g) signal processing means responsive to said first, second and third signals indicative of the instantaneous angular orientation in said three degrees of freedom of said second object relative to said first object so as to measure said relative angular orientation in three degrees of freedom of said second object with respect to said first object.

* * * * *